(12) United States Patent
Kahn

(10) Patent No.: US 12,335,432 B2
(45) Date of Patent: Jun. 17, 2025

(54) SYSTEMS AND METHODS FOR SWITCHING ZERO CHARGE CALLERS

(71) Applicant: STARLOGIK IP LLC, New York, NY (US)

(72) Inventor: Ari Kahn, Mt. Shasta, CA (US)

(73) Assignee: STARLOGIK IP LLC, New York, NY (US)

( * ) Notice: Subject to any disclaimer, the term of this patent is extended or adjusted under 35 U.S.C. 154(b) by 0 days.

(21) Appl. No.: 18/472,526

(22) Filed: Sep. 22, 2023

(65) Prior Publication Data
US 2024/0195922 A1    Jun. 13, 2024

Related U.S. Application Data

(63) Continuation of application No. 16/938,236, filed on Jul. 24, 2020, now Pat. No. 11,805,209.

(51) Int. Cl.
*H04M 15/02* (2006.01)
*H04M 3/42* (2006.01)
(Continued)

(52) U.S. Cl.
CPC ..... *H04M 15/888* (2013.01); *H04M 3/42042* (2013.01); *H04M 15/7556* (2013.01);
(Continued)

(58) Field of Classification Search
CPC ..... H04W 88/185; H04W 4/24; H04M 17/00; H04M 3/533; H04M 15/886; H04M 15/85;
(Continued)

(56) References Cited

U.S. PATENT DOCUMENTS 6,044,247 A * 3/2000 Taskett ............... H04W 88/185
                                                   379/88.26
6,349,204 B1 * 2/2002 Goetz .................. H04W 76/10
                                                   455/560
(Continued)

FOREIGN PATENT DOCUMENTS

CN      1787580 A    6/2006
CN    100589514 C    2/2010
(Continued)

*Primary Examiner* — David Q Nguyen
(74) *Attorney, Agent, or Firm* — Greenberg Traurig, LLP

(57) ABSTRACT

Asynchronous and/or synchronous zero charge telephony protocol systems and methods may include an asynchronous signaling switch and/or a call duration time quota from a synchronous charging onset to place and complete a call. A call request is received with a second device mobile address. The asynchronous systems include instructions to automatically modify the mobile address with a routing prefix when the first device has insufficient balance or independent of balance, route to the asynchronous signaling switch based on an associated modified address trunk path, revert to the call signal at the asynchronous signaling switch, and deliver and automatically disconnect the call immediately when the call is completed. The synchronous systems include instructions to automatically set the call duration time quota upon insufficient balance, and deliver and automatically disconnect the call from the second user mobile device when the call is completed and the call duration time quota is exceeded.

20 Claims, 12 Drawing Sheets

(51) Int. Cl.
*H04M 15/00* (2006.01)
*H04Q 3/76* (2006.01)

(52) U.S. Cl.
CPC ........ *H04Q 3/76* (2013.01); *H04M 2215/016* (2013.01); *H04M 2215/0164* (2013.01); *H04M 2215/32* (2013.01); *H04Q 2213/13345* (2013.01); *H04Q 2213/13353* (2013.01); *H04Q 2213/13362* (2013.01); *H04Q 2213/345* (2013.01)

(58) Field of Classification Search
CPC ............. H04M 15/881; H04M 17/103; H04M 3/42042; H04M 15/88; H04M 15/7556; H04M 15/852; H04M 15/888; H04M 2215/016; H04M 2215/0164; H04M 2215/32; H04M 3/42289; H04M 15/80; H04M 15/07; H04M 15/00; H04M 15/8061; H04M 15/8055; H04M 15/8044; H04M 2203/1008; H04Q 3/76; H04Q 2213/13353; H04Q 2213/13362; H04L 2101/65
USPC ............... 455/560, 445; 370/259; 379/88.26, 379/114.15, 93.12
See application file for complete search history.

(56) References Cited

U.S. PATENT DOCUMENTS

| | | | | |
|---|---|---|---|---|
| 6,424,706 B1* | 7/2002 | Katz | ................... | H04M 15/765 379/114.15 |
| 6,952,575 B1* | 10/2005 | Countryman | ........ | H04Q 3/0029 455/445 |
| 6,975,852 B1* | 12/2005 | Sofer | ................... | H04M 17/20 455/406 |
| 7,457,290 B1 | 11/2008 | Salama | | |
| 7,945,242 B2 | 5/2011 | Kahn | | |
| 8,275,119 B2 | 9/2012 | Kahn | | |
| 8,433,055 B2 | 9/2013 | Kahn | | |
| 8,526,598 B2 | 9/2013 | Kahn | | |
| 8,817,667 B2* | 8/2014 | Hou | ...................... | H04Q 3/0045 370/259 |
| 8,818,328 B2 | 8/2014 | Kahn | | |
| 9,264,552 B2 | 2/2016 | Kahn | | |
| 9,860,387 B2 | 1/2018 | Kahn | | |
| 10,187,528 B2 | 1/2019 | Kahr | | |
| 10,298,749 B2 | 5/2019 | Mumick et al. | | |
| 10,341,498 B2 | 7/2019 | Kahn | | |
| 10,728,385 B2 | 7/2020 | Kahn | | |
| 10,868,918 B2 | 12/2020 | Kahn | | |
| 11,006,000 B2 | 5/2021 | Kahn | | |
| 11,039,010 B2 | 6/2021 | Kahn | | |
| 2003/0099337 A1* | 5/2003 | Lord | ...................... | H04M 15/55 379/93.12 |
| 2004/0258229 A1* | 12/2004 | Mayron | ............... | H04M 15/854 455/406 |
| 2007/0232356 A1 | 10/2007 | Wang | | |
| 2011/0145149 A1* | 6/2011 | Valdes | ................... | G06Q 20/10 705/44 |
| 2014/0233581 A1* | 8/2014 | Namihira | ............... | H04L 49/356 370/408 |
| 2016/0127210 A1 | 5/2016 | Noureddin et al. | | |
| 2017/0331946 A1 | 11/2017 | Mumick et al. | | |
| 2018/0124124 A1 | 5/2018 | Corona et al. | | |
| 2021/0118074 A1* | 4/2021 | Liu | ...................... | G06Q 20/102 |
| 2021/0350197 A1* | 11/2021 | Chow | ................ | G06Q 20/3829 |

FOREIGN PATENT DOCUMENTS

| | | |
|---|---|---|
| CN | 109892006 B | 6/2021 |
| EP | 2609726 B1 | 9/2014 |
| WO | 0010313 A2 | 2/2000 |
| WO | 2012093379 A1 | 7/2012 |
| WO | 2016141629 A1 | 9/2016 |
| WO | 2021108028 A1 | 6/2021 |

\* cited by examiner

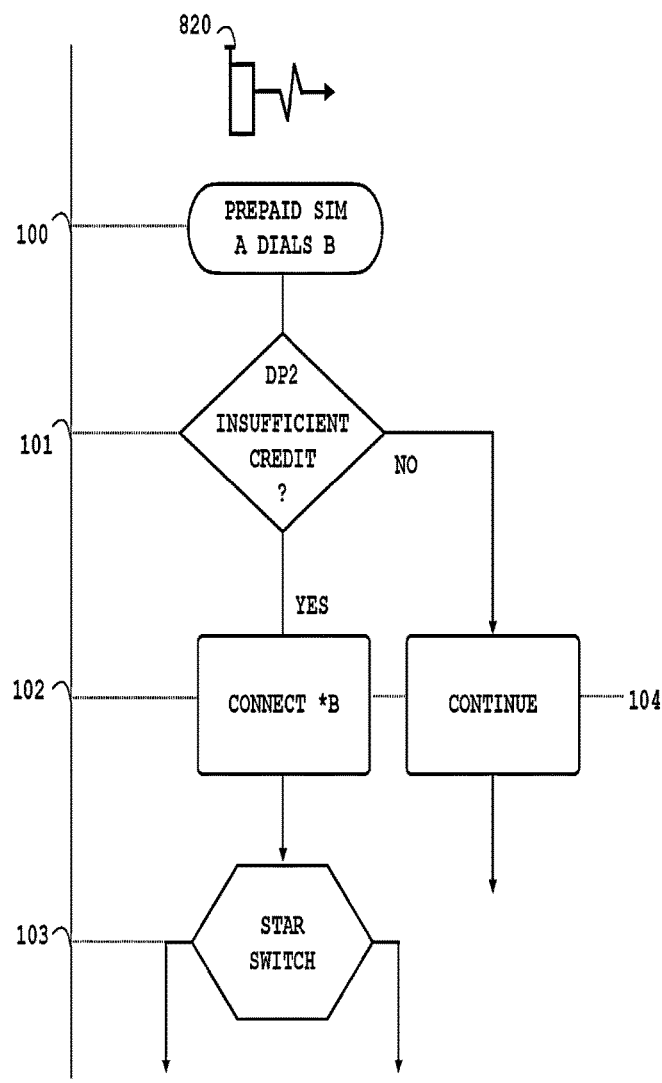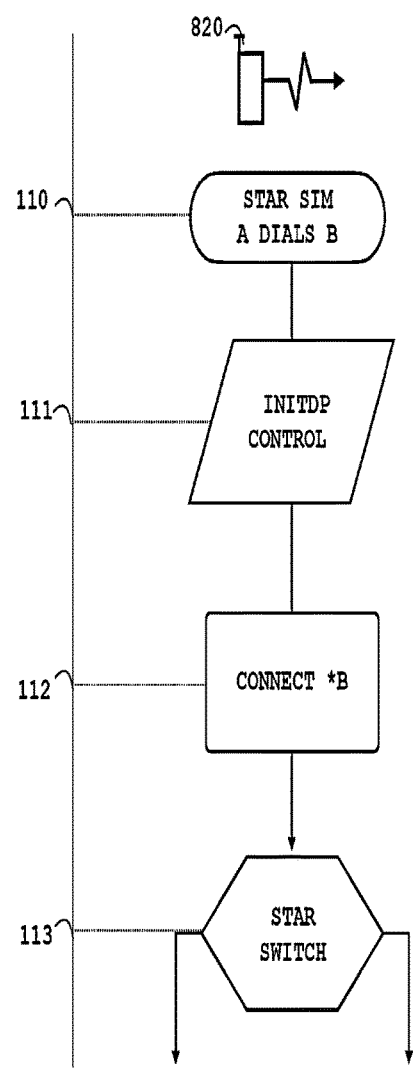
FIG.1A
FIG.1B

|   | 400 CARRIER | 401 CARRIER | 402 STAR | 403 DELTA | 404 NOTES |
|---|---|---|---|---|---|
| 405 | ISUP IAM (A,*B) | > EGRESS | SIP INVITE (A,*B) | | |
| 406 | ISUP ACM | < INGRESS | SIP 100 TRYING | 0msec | OPTIONAL RESPONSE |
| 407 | ISUP CPG ALERTING | < INGRESS | SIP 180 RINGING | 0msec | RBT ZERO POST DIAL DELAY |
| 408 | ISUP ANS | < INGRESS | SIP 200/OK | 1000msec | OPTIONAL CDR. BLACKHOLED MEDIA IP 0.0.0.0 |
| 409 | ISUP REL | < INGRESS | SIP BYE | 100msec | EXEMPLARY DISCONNECT |
| 410 | ISUP RLC | > EGRESS | SIP 200 | | |

FIG.4A

|   | 440 STAR | 441 CARRIER | 442 CARRIER | 443 DELTA | 444 NOTES |
|---|---|---|---|---|---|
| 445 | SIP INVITE (A,B) | > INGRESS | ISUP IAM (A,B) | | |
| 446 | SIP 100 TRYING | < EGRESS | ISUP ACM | | |
| 447 | SIP 180 RINGING | < EGRESS | ISUP CPG ALERTING | | |
| 448 | SIP CANCEL | > INGRESS | ISUP REL | 0msec | 0MSEC = FLASH RING (1000MSEC = ONE RING) |
| 449 | SIP 200 | < EGRESS | ISUP RLC | | SIP <-487 AND ->ACK OMITTED |

FIG.4B

SYSTEMS AND METHODS FOR SWITCHING ZERO CHARGE CALLERS

TECHNICAL FIELD

The present specification generally relates to intelligent network (IN) switching systems and, more specifically, to systems and methods for switching and servicing callers based on insufficient account balance or independent of balance. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Users of many of the prepaid mobile calling systems of today may find themselves without any credit or with insufficient credit to place a call. Users may have insufficient resources for telecommunications to purchase credit or fund an account balance sufficient to place a call. Thus, the cost of access to such mobile calling systems is prohibitive to many users. A need exists for alternative mobile calling systems to provide access to such users.

SUMMARY

In one embodiment, a zero charge telephony protocol system includes one or more processors, a non-transitory memory communicatively coupled to the one or more processors, and machine readable instructions. The machine readable instructions are stored in the non-transitory memory and cause the system to perform at least the following when executed by the one or more processors: receive, from a first user mobile device associated with a first user account, a call signal comprising a request to place and complete a call to a mobile address of a second user mobile device; automatically modify the mobile address with a routing prefix to generate a modified call signal comprising a modified address, including the routing prefix, when the first user account has insufficient balance to complete the call or is independent of balance; route to an asynchronous signaling switch based on a trunk communication path associated with the modified address; revert the modified call signal at the asynchronous signaling switch to the call signal; deliver the call signal from the asynchronous signaling switch to the second user mobile device to complete the call; and automatically disconnect the call from the second user mobile device immediately upon receipt of the call signal by the second user mobile device.

In another embodiment, a method of implementing a zero charge telephony protocol includes receiving, from a first user mobile device associated with a first user account, a call signal comprising a request to place and complete a call to a mobile address of a second user mobile device, and automatically modifying the mobile address with a routing prefix to generate a modified call signal comprising a modified address including the routing prefix when the first user account has insufficient balance to complete the call or is independent of balance. The method may further include routing to an asynchronous signaling switch based on a trunk communication path associated with the modified address, reverting the modified call signal at the asynchronous signaling switch to the call signal, delivering the call signal from the asynchronous signaling switch to the second user mobile device to complete the call, and automatically disconnecting the call from the second user mobile device immediately upon receipt of the call signal by the second user mobile device.

In one other embodiment, a zero charge telephony protocol system includes one or more processors, a non-transitory memory communicatively coupled to the one or more processors, machine readable instructions stored in the non-transitory memory that cause the system to perform at least the following when executed by the one or more processors: receive, from a first user mobile device associated with a first user account, a call signal comprising a request to place and complete a call to a mobile address of a second user mobile device; automatically set a call duration time quota upon a synchronous charging onset when the first user account has insufficient balance to complete the call; deliver the call signal to the second user mobile device to complete the call; and automatically disconnect the call from the second user mobile device when the call duration time quota is exceeded after the synchronous charging onset.

These and additional features provided below will be more fully understood in view of the following detailed description, in combination with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in combination with the following drawings, where like structure is indicated with like reference numerals, and in which:

FIG. 1A schematically depicts a flowchart of a method for a dual zero charge subscriber identification module (SIM) card system and a balance-dependent (e.g., prepaid) SIM card associated with a first user mobile device, according to one or more embodiments shown and described herein;

FIG. 1B schematically depicts a flowchart of a method for single zero charge SIM card system including a balance-independent SIM card associated with a first user mobile device, according to one or more embodiments shown and described herein;

FIG. 4A schematically depicts a control scheme for an originating flash hook protocol for the control schemes for FIG. 3A or 3B, according to one or more embodiments shown and described herein;

FIG. 4B schematically depicts a control scheme for a terminating flash hook protocol for the control schemes for FIG. 3A or 3B, according to one or more embodiments shown and described herein;

DETAILED DESCRIPTION

Embodiments of the present disclosure are directed to technology for cellular call access and related mobile calling systems. Such technology may be configured to interact with a smart mobile device of a user, for instance. The term "interact" or "interaction" as referenced herein describe an electronic communication including a transmission and reception of electronic data signals directly or indirectly between at least two electronic devices, such as through wired or wireless electronic communication networks. Various autonomous navigation methods and systems will be described in more detail herein with specific reference to the corresponding drawings.

Figure 1C:
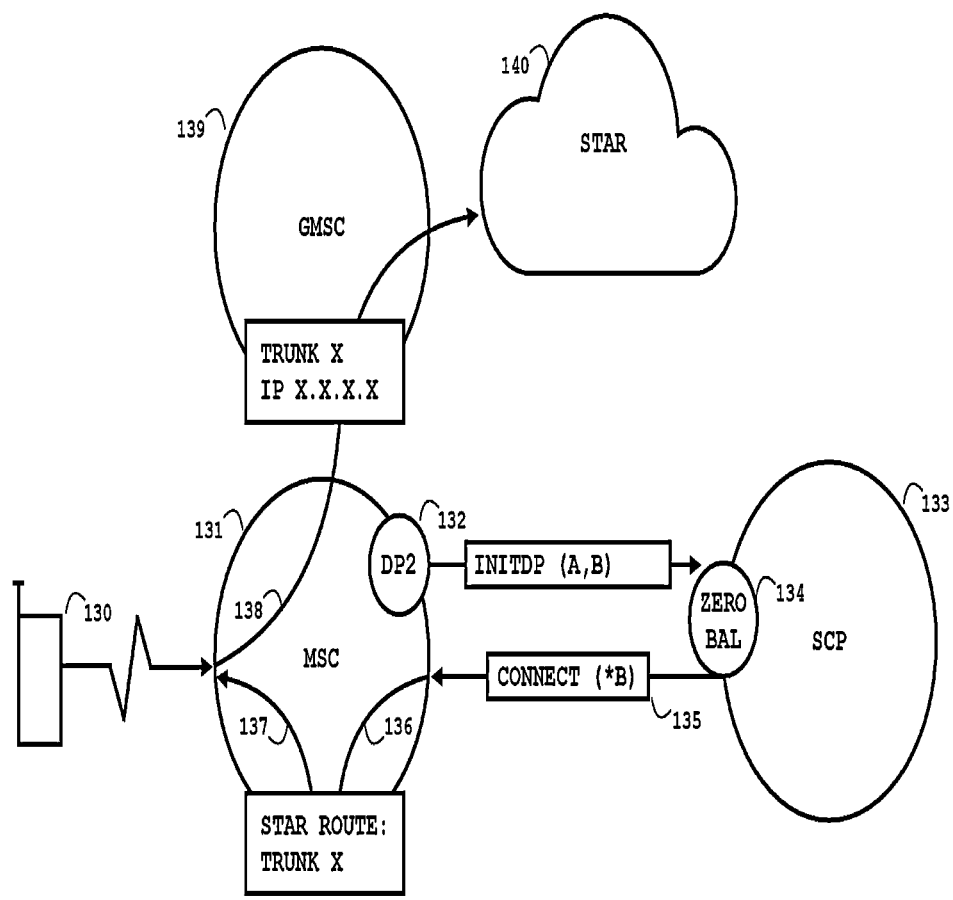
FIG. 1C schematically depicts a routing and switching scheme for the zero charge SIM card system of FIG. 1A or the balance-independent SIM card of FIG. 1B, according to one or more embodiments shown and described herein.
Figure 2:
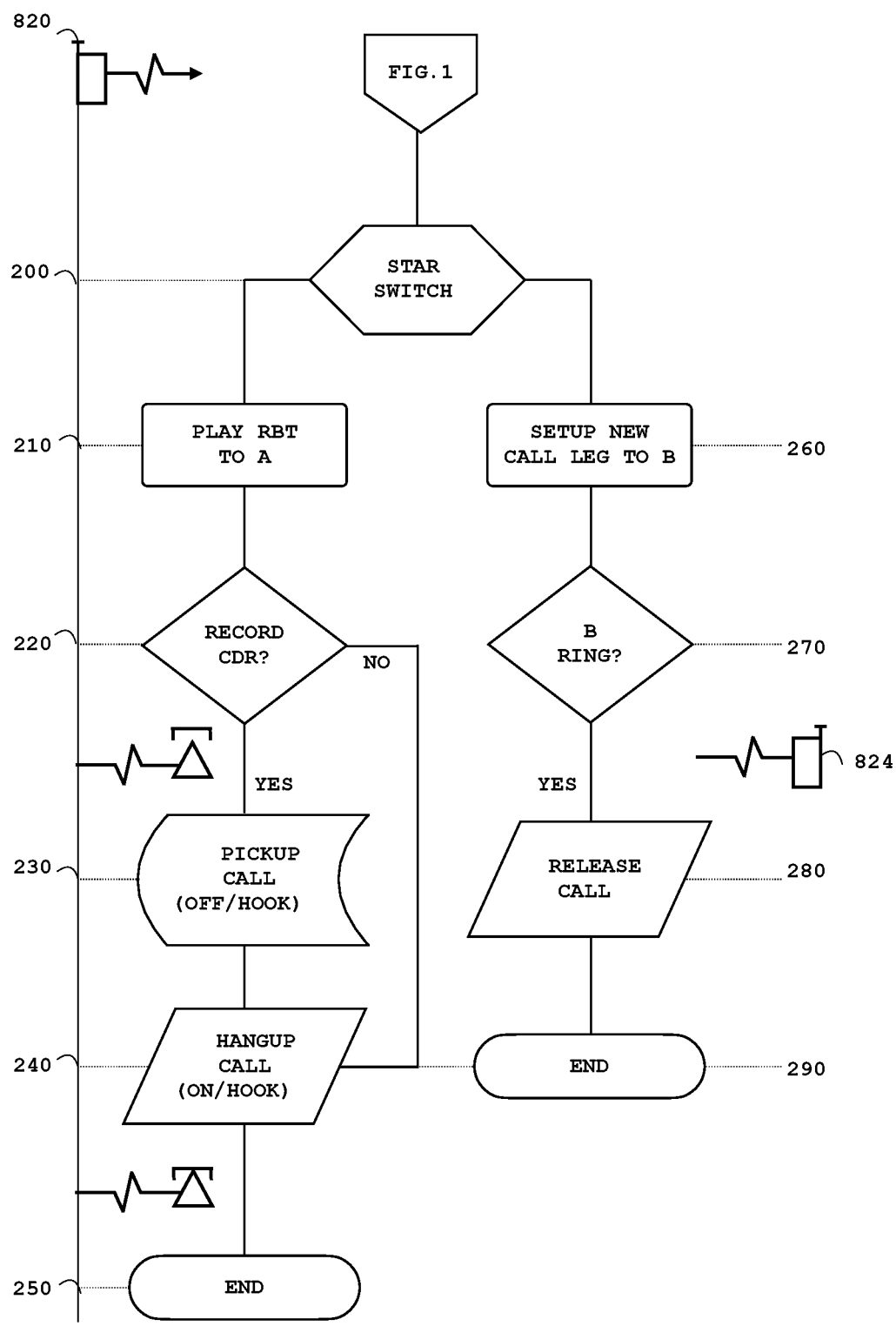
FIG. 2 schematically depicts a flowchart of a method for continuing the method of FIG. 1A or FIG. 1B upon using the scheme of FIG. 1C, according to one or more embodiments shown and described herein.
Figure 8:
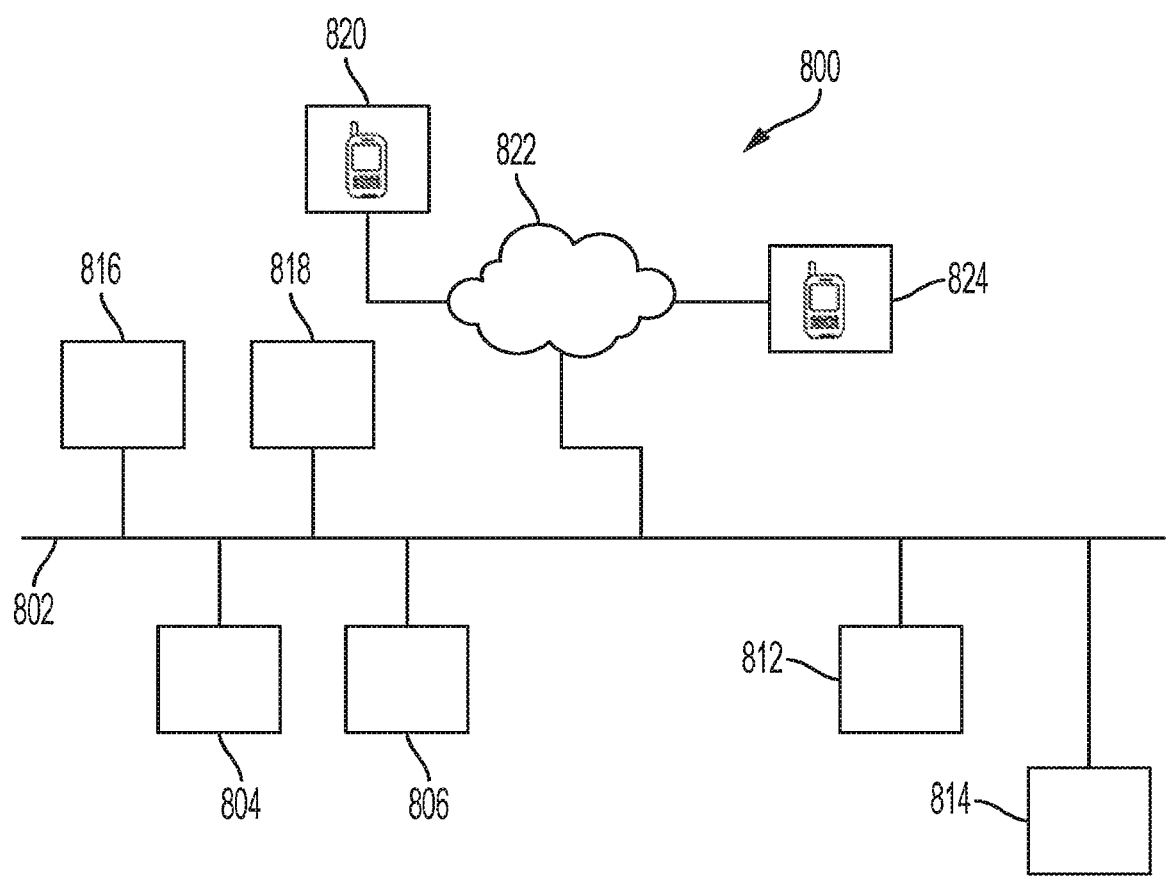
FIG. 8 schematically depicts a system for implementing computer and software based methods for the zero charge SIM card protocols, according to one or more embodiments shown and described herein.

As described below, the mobile calling systems and methods provide an asynchronous calling scheme between a first user mobile device 820 of a first user, a second user mobile device 824 of a second user (as shown in FIGS. 2, and 8), and a switching node as a switch component 812 (as shown in FIG. 8) such that the first user mobile device is not charged for placing and momentarily completing a call to the second user mobile device through use of a customized connection logic. An embodiment of the switch component 812 is shown as "Star Switch" based on a star symbol routing prefix in FIGS. 1A, 1, and 2, and will be described in greater detail below. Reference to "Star Switch" may be similarly applied to other embodiments of the switch component 812 based on a routing prefix other than a star symbol routing prefix.

Further, a caller may place and complete the call when the caller has insufficient account balance, e.g. associated with a SIM card, which is SIM card is associated with a user mobile device. In embodiments of the asynchronous calling scheme, as will be described in greater detail below with respect to at least FIGS. 1A-6A and 8, a call from the first user mobile device by the first user to the second user mobile device of the second user is indirectly placed by being first sent by the first user mobile device to the switching node using the customized connection logic, disconnected by the switching node from the first user mobile device, and sent from the switching node to the second user mobile device such that the first user mobile device is not directly connected to the second user mobile device, and the first user mobile device is not charged for the call. In embodiments of synchronous calling schemes, as described below with respect to at least FIGS. 6C and 8, a call duration time quota may be applied at charging onset to the first user mobile device to automatically and immediately disconnect the call at the second user mobile device, e.g., prior to incurring a charge. Thus, through the customized connection logic of asynchronous calling schemes and/or as synchronous calling schemes, users may place and complete calls without an account balance, or with insufficient balance.

In many current mobile calling systems, a prepaid or postpaid synchronous mobile calling system is utilized in which a positive balance is required to place and complete a call. As described herein, a placed call is indicative of initiating a call signal associated with a request to dial a mobile address of another user device, a completed call occurs upon receipt of the call signal by another user device at the mobile address (e.g., ringing at the other user device), and an answered call is associated with an answering of the completed call (e.g., pickup and speech). With balance-dependent prepaid mobile calling systems, a first user with limited funds may attempt to place (e.g., dial and send) a call through a first user mobile device to a second user mobile device of a second user, which rings as a completed call (which ringing does not incur a charge), and then disconnect prior to answer of the ringing that would incur a charge. Such a beeping or flashing method is used to signal the second user to call back the first user without the first user incurring a charge. Thus, the second user is aware of the missed call, and calls the first user back to incur the call charge and effectively reverse charges.

However, while ringing is free, many prepaid mobile calling systems require a sufficient paid (e.g., debit) balance to initiate and progress the call to ringing, and thus to place and complete the call. Users may find themselves with insufficient credit (e.g., balance) after depleting a prepaid account for airtime and cellular access, and consequently are prevented from even placing a call based on the insufficient credit. Further, many users do not have financial resources for telecommunications. Those who cannot provide an initial sufficient paid balance are denied access and an ability to place a call to begin with, even with respect to attempting to place the call for ringing only to signal another party of a communication attempt. The present mobile calling systems and methods provide access to such users to place a call using the customized connection logic of asynchronous and/or synchronous calling that permits the caller to place and momentarily complete a call even with a zero balance and/or insufficient balance on a SIM card.

The present mobile calling systems and methods may service calls from a first user mobile device that does not have a balance or paid airtime by implementing a switching scheme on an Intelligent Network (IN) to automatically modify and translate the call to include a routing prefix based on a customized manual coding to address the switching node as a signaling node that delivers a communications protocol associated with the customized connection logic. IN involves a telephone network architecture with a call IN service logic that may be executed remote from switching facilities. A portion of the dialed number may trigger a service request, such as an "800" toll-free portion being translated into a regular PTSN number. Embodiments described herein may further modify and translate the dialed number to include a routing prefix, and based on a pre-configured manual number routing lookup table, to switch the call to an asynchronous switching node to further process the service request and automatically separate the call into a first portion between the caller and an asynchronous switching node and a second portion, between the asynchronous switching node and the called party. A manual routing entry, in a lookup table in the originating mobile switch, is referenced to translate into a route and provide a pre-configured route for the modified dialed number, for automated processing by the asynchronous signaling switch. Translate as described herein may be indicative of a routing and translation of a prefix with respect to a mobile address. Furthermore, such a manual routing entry may encompass a wildcard routing entry to catch and direct yet undefined and not yet pre-configured routes to avoid a call routing failure. The system may determine routing to occur for a number with more significant digits to route over less significant digits (e.g., *1234 will take routing precedence over *123). When a dialed sequence fails to match one or more of the pre-configured defined routes in the manual routing entry lookup table, the wildcard entry may be utilized to route the modified number to a catch-all route destination identifying the asynchronous signaling switch. The routing entries, as described in greater detail below with respect to FIG. 1C, which illustrates an automated prefixing, routing, and switching scheme, including a loopback with a requirement of a routing table entry in the originating Mobile Switching Center (MSC) to which the connection code associated with the modified address references. Reference to a Star Switch as an embodiment utilizing a routing prefix symbol of a star (*) before a dialed address may similarly apply disclosed protocols for other routing prefix embodiments (e.g., multiple stars and/or other symbols or numbers configured to modify the dial address with a prefix, translate and route the modified address to the dialed party). As described below with respect to FIG. 1C, prior to an MSC connecting the call to the modified route prefixed address, the MSC performs a digit analysis and pre-configured routing table lookup to determine a trunk indicator (e.g., Trunk X) associated with the modified route prefixed address and routes the call along the trunk indicator to a Gateway MSC (GMSC). The trunk indicator is indicative of a Trunk configured as a communication path (e.g., trunk communication path) to carry simultaneous multiple signals while providing a network access between two points, such as switches or nodes. The GMSC then routes traffic received along the designated Trunk based on the trunk indicator to an IP address (for example, a SIP Trunk indication) of the asynchronous signaling switch, which then proceeds to deliver a flash signaling protocol to the receiving party as described herein.

In one embodiment, a balance-independent SIM card is provisioned without airtime and does not require prepaid funds (e.g. a positive balance) and is configured to be controlled by an IN service logic to bypass billing while placing and completing a call. Additionally or alternatively, a balance-dependent (e.g., prepaid) SIM card provisioned with airtime that has become depleted is also configured to be controlled by IN service logic while engaging a ring to place the call. Thus, even users with zero and/or insufficient balance (e.g., prepaid airtime) may place and complete a call. The asynchronous mobile calling systems and methods described herein implement the customized connection logic and switching scheme to receive the call from the first user mobile device intended for the second user mobile device through the switching node, ring back to and disconnect from the first user mobile device, then ring forward to and disconnect from the second user mobile device, where the first user mobile device is not charged for placement and completion of the call.

Telephony calls in which at least two mobile device users may speak to one another may progress through a Basic Call State Model (BCSM) using standardized Points in Call (PICS), which are sequential steps at which service logic may be applied prior to further progressing a call. The BCSM is a finite state machine, which with PICS permits a Mobile Switch (MSC) to interact with IN nodes to perform authentication, billing verification, and call progress monitoring. During a billing verification, the call may be paused to determine whether the account of the user placing the call has a sufficient balance or credit to continue and complete the call such that the call is permitted to advance and mature into a ringing state and an answered state. Billing systems may be used that utilize rating engines and tables, including, but not limited to, Online Charging Systems (OCS), and billing based on associated Call Data Records (CDRS) to record transactions on a digital network. For a user with a balance-dependent (e.g., prepaid) account that is a zero balance or has otherwise insufficient funds, network services may be suspended and calls prevented until the user replenishes their account. Embodiments of the mobile calling systems and methods described herein and in greater details below with respect to FIGS. 1-8 permit such users and/or users without any prepaid account to place and connect a call to engage ringing and incur zero costs through use of associated customized connection logic embodiments. As non-limiting examples, (1) a prepaid SIM card may be utilized concurrently with a balance-independent SIM card, which is activated upon insufficient funds being available, (2) a balance-independent SIM card may be used by itself such that a user is not required to prepay any funds to place a call, and/or (3) a dual function balance-independent-prepayable SIM card may be used that allows a user to place and complete a call without prepayment of funds, and also permits the user the option to receive funds or prepay funds, to incur call charges if desired.

TABLE 1 below sets forth a glossary of acronym definitions and terms as utilized within this disclosure.

TABLE 1

| | |
|---|---|
| ACH | Apply Charging |
| ACM | Address Complete Message |
| ACK | Acknowledgment |
| ANS | Answer |
| API | Application Programming Interface |
| BCSM | Basic Call State Model |
| BHCA | Busy Hour Call Attempts |
| CAMEL | Customized Applications for Mobile network Enhanced Logic |
| CDMA | Code Division Multiple Access |
| CDR | Call Data Record |
| CDRS | Call Data Records |
| CHT | Call Hold Time |
| CLI | Calling Line Identity |
| CLIP | Calling Line Identity Presentation |
| CLIR | Calling Line Identity Restriction |
| CPG | Call Progress |
| CSE | CAMEL Service Environment |
| CSI | CAMEL Subscription Information |
| DP2 | Detection Point 2 |
| EDP-R | Event Detection Point Request |
| FLASH | Momentary Connect and Disconnect |
| GMSC | Gateway MSC |
| GPRS | General Packet Radio Service |
| GSM | Global System for Mobile Communications |
| GSMSCF | GSM Service Control Function |
| GSMSSF | GSM Service Switching Function |

TABLE 1-continued

| | |
|---|---|
| GSMSSG | GSM Service Selection Gateway |
| HLR | Home Location Register |
| IAM | Initial Address Message |
| IMSI | International Mobile Subscriber Identity |
| IN | Intelligent Networking/Intelligent Network |
| INITDP | Initial Detection Point |
| INAP | Intelligent Network Application Protocol |
| IP | Internet Protocol |
| ISDN | Integrated Services Digital Network |
| ISUP | ISDN User Part |
| IVR | Interactive Voice Response |
| MAP | Mobile Application Part |
| MMS | Multimedia Messaging Service |
| MS | Mobile Station |
| MSISDN | Mobile Subscriber ISDN |
| MSC | Mobile Switching Center |
| MO | Mobile Originating |
| MSRN | Mobile Station Roaming Number |
| MVNO | Mobile Virtual Network Operator |
| OBCSM | Originating Basic Call State Model |
| OCS | Online Charging System |
| O-CSI | Originating Camel Subscription Information |
| OFFHOOK | Answering a call (Connect) |
| ONHOOK | Hanging up a call (Disconnect) |
| OSS | Operator Specific Service |
| PDD | Post Dial Delay |
| PICS | Points in Call |
| PING | Signaling Caller Identity |
| PSTN | Public Switched Telephone Network |
| RRBE | Request Report BCSM Event |
| RAN | Radio Access Network |
| RBT | Ring-back-tone |
| RCS | Rich Communication Services |
| REL | Release |
| RLC | Release Complete |
| RTP | Realtime Transport Protocol |
| SBC | Session Border Controller |
| SCP | Service Control Point |
| SIM | Subscriber Identification Module |
| SIP | Session Initiation Protocol |
| SK | Service Key |
| SLPI | Service Logic Program Instance |
| SMS | Short Message Service |
| SRF | Specialized Resource Function |
| SS7 | Signaling System Seven |
| STAR SIM | Zero Airtime SIM serviced by Star IN Logic |
| TDMA | Time Division Multiple Access |
| UMTS | Universal Mobile Telecommunications System |
| URI | Uniform Resource Identifier |
| USSD | Unstructured Supplementary Services Data |
| VLR | Visitor Location Register |
| VOIP | Voice Over Internet Protocol |

Referring to FIG. 1A, an embodiment is disclosed of a prepaid (e.g., balance-dependent) SIM card, which is activated when there is an insufficient balance or funds available to use the prepaid SIM card. FIG. 1A works in conjunction with the method of FIG. 2, as described in greater detail further below.

Referring again to FIG. 1A, flow items 100-103 are representative of initial steps to progress through by the prepaid SIM card system prior to progression to the flow items of FIG. 2. In flow item 100, the first user (e.g., user A) has a prepaid account associated with the prepaid SIM card and dials through the first user mobile device 820 a telephone number of the second user mobile device 824 of the second user (e.g., user B). In flow item 101, the dual SIM card system is configured to determine whether the prepaid SIM card has insufficient credit to place the call. Referring to flow item 101, a servicing Mobile Switching Center (MSC)/Global System for Mobile Communications (GSM) Service Selection Gateway (gsmSSG), hereinafter MSC/gsmSSG, received a call setup request. It is contemplated by and within the scope of this disclosure that other cell phone service technologies such as Code Division Multiple Access (CDMA) may be utilized by the systems and methods described herein. Referring back to flow item 101, on encountering an Initial Detection Point (e.g., as INITDP: D2 Collected Info) in the Originating Basic Call State Model (OBCSM), the MSC initiates a dialog with an IN controller node associated with the prepaid SIM card. The IN controller node address, stored in the SIM profile in home location register (HLR), is propagated together with other SIM profile data into the MSC/visitor location register (VLR) originating call subscription information record when the prepaid SIM card registers and attaches to the network. The call setup request encounters an IN credit verification in flow item 101 to query a balance of the prepaid account associated with the prepaid SIM card of user A, to determine whether A has insufficient credit.

If the answer is No, such that the prepaid SIM card has sufficient balance to place the call, the next step proceeds to flow item 104 to continue to place the call based on the prepaid SIM card and incur charges to the prepaid SIM card for any air time consumed once the call is answered. Thus, if the prepaid account associated with the first user mobile device 820 of user A has sufficient balance or credit to complete the call, the flow progresses from flow item 101 to flow item 104. As the prepaid account of user A has sufficient balance or credit, the IN controlling node issues a Continue command to permit the call to continue based on that SIM card. This Continue command instructs the MSC to route the call to the second user mobile device 824 of user B.

However, if the answer is Yes, such that the prepaid SIM card has insufficient balance to place the call, the SIM card system is configured to implement a routing protocol in flow item 102 to implement a switch in flow item 103 momentarily complete the call, e.g., without incurring a charge. Thus, if the prepaid account associated with the first user mobile device 820 of user A has insufficient balance (e.g., prepaid or credit) to complete the call, the flow progresses from flow item 101 to flow item 102. The IN controlling node is configured to automatically modify the telephone number associated with the second user mobile device 824 of user B to incorporate a routing prefix, such as a Star (*) routing prefix in an embodiment. The modified telephone number with the routing prefix is configured to route the call to the Star Switch of flow item 103. The IN controlling node is configured to command the MSC to Connect the call on the modified telephone number, such as through a Connect *B command.

In the embodiment using the Star (*) routing prefix, such Star prefixed numbers may route based on a wildcard entry in an MSC routing table that points undefined numbers to the Star Switch of flow item 103 for further processing. Since a Star routing entry on the MSC may permit users to manually star phone numbers and thereby selectively route their calls to the Star Switch and invoke an associated flash communications protocol (to permit a signaling to the user B of a missed or ringing call attempt from user A, as described below), the modified telephone number as a modified routing address may utilize multiple stars or other routing prefixes to distinguish user versus network flash invocation.

By way of example, and not as a limitation, the IN controlling node is configured to modify the B address with a double () or a triple (*) star prefix, the latter symbolically representing zero balance ($0.00) calls. Either differentiating prefix may permit network invoked flashes (e.g., permitted ring signals) to be separately audited from those invoked by users manually star prefixing calls. Any uniquely identifying prefix may be applied separately or in combination to the star prefixes, including, but not limited to, internal numerical routing prefixes.

Referring to flow item 103 of the Star Switch, the MSC is configured to perform a routing lookup on the star prefix utilized, and route the call to the Star Switch, which conducts the communications protocol described with respect to FIG. 2 in greater detail below.

Referring to FIG. 1B, an example of an embodiment is disclosed of a balance-independent SIM card that may be used by itself such that a user is not required to prepay any funds to place a call. FIG. 1B shows a flowchart of a method for a balance-independent SIM card (e.g., a Star SIM) that continues on to work in conjunction with the method of FIG. 2 as described in greater detail further below.

Referring again to FIG. 1B, flow items 110-113 are representative of initial steps to progress through by the balance-independent SIM card system, prior to progression to the flow items of FIG. 2. In flow item 110, the first user (e.g., user A) has a first user mobile device 820 with a balance-independent SIM card configured to be serviced by an IN controller. The first user (e.g., user A) dials through the first user mobile device 820 a telephone number of the second user mobile device 824 of the second user (e.g., user B) as the dialed address.

In flow item 111, on encountering the INITDP in the OBCSM, the MSC is configured to initiate a call control dialog with a Star IN controlling node associated with the balance-independent SIM card. The associated IN node address is stored in the HLR/VLR originating subscription information record.

In flow item 112, as the balance-independent SIM card is configured to operate without airtime, the Service Logic for the Star IN controlling node does not conduct or require a credit verification, and is configured to directly proceed to modify the user B telephone number address to incorporate a routing prefix and commands the MSC to connect the call using the modified address as described herein.

In flow item 113, the MSC is configured to perform a routing lookup on the address prefix and route the call to the Star Switch, which conducts the flash communications protocol as described in greater detail further below with respect to FIG. 2. The routing lookup may reference a pre-configured routing lookup table to determine the translation and direction of the translated number, to the asynchronous signaling switch.

Such a Star IN controlling node is thus configured to singularly command the originating MSC to CONNECT the call on the modified address. While the star (*) symbol prefix is used in an embodiment, in other embodiments the prefix may be translated into or replaced with an internal routing code identifying the Star Switch. Any network routing code prefix that uniquely identifies and addresses the Star Switch may be utilized.

Referring to FIG. 1C, a prefixing, routing, and switching scheme for the zero charge SIM card system of FIG. 1A or the balance-independent SIM card of FIG. 1B is shown. In some embodiments, a dual balance-independent-prepayable SIM card may be used that allows a user to place a call without either prepayment or sufficient credit, but also permits the user the option to prepay and incur call charges if desired.

The prefixing, routing, and switching scheme for the zero charge SIM card system that may be used with either FIG. 1A or FIG. 1B methodologies includes a flow item 130, in which user A dials through the first user mobile device 820 a regular Mobile Subscriber Integrated Services Digital Network (MSISDN) telephone address of the second user mobile device 824 of user B to generate a call setup request between user A and user B. In flow item 131, a servicing MSC is configured to receive the call setup request. In flow item 132, the MSC is configured to enter the BCSM, encounter Detection Point 2 (DP2), and establish an INITDP dialog with a service control point (SCP) controller. In flow item 133, the SCP controller is configured to perform a balance or credit verification to determine whether user A has insufficient balance or credit to complete the call.

In flow item 134, in response to this zero balance condition when the SCP controller determines user A has insufficient balance or credit to place the call, the SCP controller is configured to modify the B address with a prefix, such as a star (*) prefix. Further, in flow item 134, the SCP controller may be configured to suppress an insufficient balance network announcement to user A based upon the determination that user A has insufficient balance or credit to place the call.

In flow item 135, the SCP is configured to command the MSC to connect the call to the modified telephone address (e.g., the star prefixed address or other prefix type modified address). In flow item 136, on receiving the connect command from the SCP, the MSC is configured to perform a digit analysis and routing table lookup based on the modified telephone address including the utilized prefix (e.g., the star prefix). In flow item 137, the routing table is configured to return a Trunk identifier (X) associated with the modified telephone address (e.g., the star route). In flow item 138, the MSC is configured to route the call along the Trunk X to the GMSC (e.g., the SIP Trunk). In flow item 139, the GMSC is configured to route traffic received along the Trunk X to the IP address of the asynchronous signaling switch (e.g., the Star Switch IP address). In flow item 140, the Star Switch is configured to deliver a flash signaling protocol to permit engaging and placing of the call as described in greater detail below with respect to FIG. 2.

Referring to FIG. 2, a flowchart of a method for continuing the method of FIG. 1A or FIG. 1B and upon using the prefixing, routing and switching scheme of FIG. 1C is shown. Thus, FIG. 2 continues the process of using the modified switch routing to place and complete a call, and engage a ring, without incurring a charge or cost to the account associated with the first user mobile device 820 placing the call through either the balance-dependent (e.g., prepaid) SIM card of FIG. 1A, or the balance-independent (e.g., star) SIM card of FIG. 1B.

In flow item 200, the Star Switch is configured to logically and physically decouple the call originating/uplink (left side) and terminating/downlink (right side) legs by signaling them independently, in the backward direction to the caller and in the forward direction to the called, along distinct routes of flow items 210 and 260, respectively. These two independent call paths may be signaled substantially simultaneously.

In flow item 210, which describes the process along the independent call path between the first user mobile device 820 and the switching node as the originating call setup leg, the MSC is configured to route to the Star Switch via a Gateway Mobile Switching Center/Session Border Controller (GMSC/SBC), and the Star Switch is configured to respond by instantly presenting a ring-back-tone (RBT) to user A. The RBT generates a preemptive ring signal to provide comfort to user A that the call is accepted and is being presented to user B.

In flow item 220, the Star Switch is configured to determine via a configuration setting whether a native MSC CDR generation on the originating carrier network is requested. If a CDR is not requested per the Star Switch configuration, the call flows to flow item 240. However, if the CDR generation option is set, the call flows to flow item 230 and the Star Switch is configured to answer the call by going OFF HOOK. Answering the call starts a call duration timer that records the duration of the connected (answered) call.

The call then flows to flow item 240, in which the Star Switch is configured to then hang up the call if progressing through flow item 230 by going back ON HOOK momentarily thereafter. Since a CDR typically records call durations in increments of 1 second, milliseconds are either rounded up or down to the nearest second. In order to generate, for example, a zero second CDR, the Star Switch may simply disconnect the call within 500 milliseconds (ms). To cater for signaling latency, such a zero second CDR embodiment would substantially connect and disconnect within milliseconds. For example, the call may be answered and then disconnected 100 ms thereafter. The present disclosure describes a manner to generate and suppress billing for unanswered calls through the MSC recording these early CDRS. For example, the HOOK FLASH signaling permits carriers to generate native zero second CDRS on the MSC for recording these such signaled calls.

During flow item 240, the Star Switch is configured to disconnect the call. If the call was previously answered in flow item 230, the state returns to ON HOOK. Otherwise if progressing directly between flow items 220 and 240, the call is terminated without answering and the originating/uplink leg of the call is complete. Thus, in flow item 250, the first user mobile device 820 is serviced and disconnected from the call.

With respect to the terminating/downlink leg on the right side between the Star Switch and the second user mobile device 824, flow item 200 progresses to flow item 260. In parallel to signaling on the uplink as shown through flow items 210-250, the Star Switch is configured to establish a call leg on the downlink path towards a destination to the second user mobile device 824 of user B. The call to user B is set with calling line identity for user A associated with the first user mobile device 820 and extracted from the uplink request signal. The call routes via an SBC/GMSC to the network of user B.

In flow item 270, the Star Switch is configured to respond to indication that the second user mobile device 824 of user B is ringing or otherwise alerting the user B of an incoming call identifying the user A. In flow item 280, in response to mobile device 824 ringing, the Star Switch is configured to cancel the call. In flow item 290, cancelling the call releases and completes the downlink dialog and leg, which has now successfully deposited a ring bearing the calling line identity of user A at the destination second user mobile device 824 of user B.

Thus, referring to FIG. 2, in one embodiment, the user A attempting to place a call to the second user mobile device 824 of user B as the caller from the first user mobile device 820 is switched ON/OFF the air prior to the system alerting user B. In an embodiment, the system switches and signals the zero airtime call to deliver an asynchronous flash communication with user A and user B through the following sequence of steps. With respect to user A, the call from the first user mobile device 820 of user A is disconnected via the switching node in the backward (originating/uplink) direction to user A, e.g., after one ring. With respect to user B, the call to the second user mobile device 824 of user B is disconnected via the switching node in the forward (terminating/downlink) direction to user B, e.g., after one ring. Such an asynchronous and disconnected communication protocol is configured to prevent the call from progressing to speech, i.e., as would generally incur a charge, as the protocol prevents user A from being directly connected through to user B. Since the originating and terminating call phases are logically and physically decoupled such that they are switched, signaled and disconnected independently, the disclosed methods and systems are asynchronous and do not establish synchronous end to end connectivity directly between users A and B. Thus, user A is not online when the second user mobile device 824 of user B rings. Through the protocols disclosed herein, billing may be reversed on callback from user B to user A, such that revenue may flow from zero airtime events of the signaling call from user A to user B.

Further, while the RBT provides user A with auditory confirmation, the automatic disconnect provides user A with visual confirmation that the request was serviced to completion. In an embodiment in which user A as the caller is switched ON and OFF the airwaves in just one second, even though the B party has yet to be alerted, the preemptive and accelerated RBT comforts the user that the call is being made to user B by the switching node.

If the Star Switch is unable to contact the second user mobile device 824 of user B on the downlink leg of FIG. 2, the call may automatically enter a retry schedule. Automatically retrying such failed call attempts on behalf of the user A may attenuate repetitive manual redialing by user A. Such repetitive manual redial behavior may spiral into a negative feedback loop that exacerbates network load and busy conditions, resulting in more and more failed call attempts. The preemptive RBT and automated retry solution, for example, on a retry schedule, as disclosed, delivers accelerated asynchronous digital ringing.

The Star Switch signaling of FIG. 2 is described in greater detail with respect to FIGS. 3A and 3B below, which depict step ladder sequences for flash signaling embodiments for respectively the prepaid call with insufficient balance and the balance-independent SIM card of corresponding FIGS. 1A and 1B.

Figure 3A:
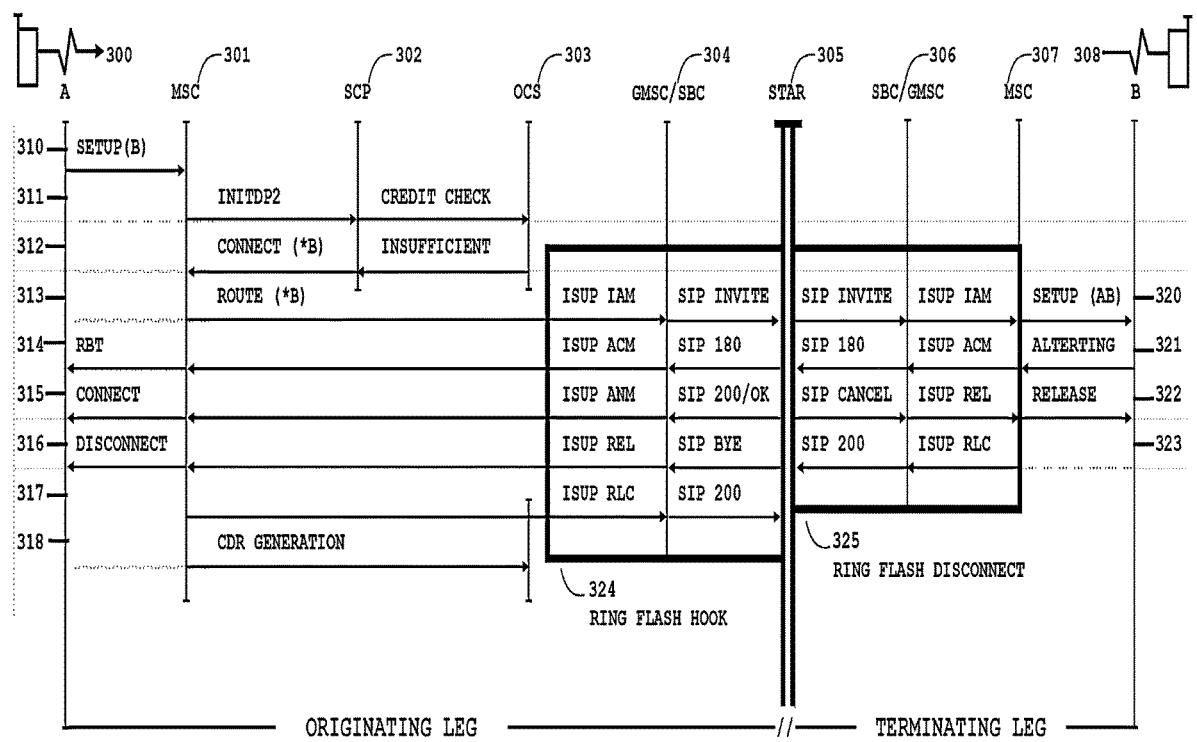
FIG. 3A schematically depicts a control scheme illustrating a sequential step ladder structure utilizing the methods of FIG. 1A and FIG. 2, according to one or more embodiments shown and described herein.

Referring to FIG. 3A, a control scheme illustrating a sequential step ladder structure utilizing the methods of FIG. 1A and FIG. 2 is shown. In flow item 310, the first user has a prepaid user account associated with the first user mobile device 300 (e.g., an embodiment of the first user mobile device 820) and dials a telephone number of the second user mobile device 308 (e.g., an embodiment of the second user mobile device 824) of user B. The first user mobile device 300 of user A is configured to transmit a call setup as a Mobile Originating (MO) to the servicing MSC 301. The setup message contains the signals such as the telephone address of user B in addition to other call parameters. The MSC enters the OBCSM encountering the INITDP.

In flow item 311, the INITDP opens a call control dialog with Prepaid Service Control Point (SCP) 302, the address of which is recorded in the SIM subscription information in the MSC/VLR 301.

In a customized applications for mobile networks enhanced logic (CAMEL) setting, the system may employ standards that work on a Global Systems for Mobile Communications (GSM) core network or the Universal Mobile Telecommunications System (UMTS) network. In a CAMEL O-CSI (Originating Camel Subscription Information) embodiment, the MSC has an associated gsmSSF (GSM Service Switching Function), and the SCP is referred to as the gsmSCF (GSM Service Control Function). The SCP 302 is configured to perform a credit verification for user A, for example, by querying an Online Charging System (OCS) 303, or a Prepaid Billing System, to determine whether an account associated with user A has sufficient credit to complete the call. While SCP 302 and OCS 303 are depicted as separate nodes, they may be the one and same logical or physical node, and they may embody both call and billing control.

In flow item 312, in response to the credit check, the OCS 303 may respond to the SCP 302 that user A has insufficient credit. In response to the credit insufficiency, the SCP modifies the mobile address of user B with a prefix identifying the Star Switch 305 and instructs the MSC 301 to connect the call using the supplied modified address.

In flow item 313, the MSC 301 performs a routing lookup on the prefix to determine a trunk/route to the Star Switch 305, which may be hosted in the Cloud (e.g., as described in greater detail below with regard to FIG. 8), and transmits an Integrated Services Digital Network User Part (ISUP) IAM (Initial Address Message) to the GMSC/SBC 304, which begins the uplink dialog 324. The GMSC/SBC 304 is configured to interwork between a Signaling System Seven (SS7) and an IP network, and in one embodiment, to perform signaling translation between ISUP and SIP (Session Initiation Protocol). In such an ISUP/SIP translation, ISUP IAM is translated into SIP INVITE, which is transmitted to the Star Switch 305. The ISUP includes messaging protocol such as IAM and is a part of SS7 used to set up telephone calls in a public switched telephone network (PSTN). A Mobile Application Part (MAP) may be used as an SS7 protocol to setup and control calls via the PSTN through providing an application layer for GSM and UMTS mobile core networks and general packet radio service (GPRS) core networks for communication between and servicing of mobile users. Telephone exchanges (e.g., switches) may be connected via T1 or E1 trunks as shared communication line paths to transport speech from calls. SIP is a signaling protocol to initiate, maintain, and terminate real-time multimedia (e.g., voice, video, and/or messaging) sessions for internet telephony applications and/or instant messaging over Internet Protocol (IP) networks and/or voice over IP (VOIP) networks.

In flow item 314, on receiving the SIP INVITE, the Star Switch 305 is configured to respond with a SIP 180/RINGING message in the backward direction, which may be instantaneous, and which commands the GMSC/SBC 304 to return an ISUP Address Complete Message/Call Progress (ACM/CPG) Alerting message notifying the MSC 301 that the destination is ringing. In turn, the MSC 301 presents a RBT to the first user mobile device 300 of user A. In responding with SIP/180 as a ringing message, the Star Switch 305 matures the call into a placed and completed call (a successful call setup).

In flow item 315, when a native CDR generation at MSC 301 is required, the Star Switch 305 in one embodiment is configured to wait one second after issuing the SIP/180 code and then commands the GMSC/SBC 304 to connect the call by issuing a SIP 200/OK code, which in turn is translated into an ISUP Answer (ANS) message at GMSC/SBC 304 to notify the MSC 301 that the call has been answered. At this point, the call has gone OFF HOOK, and a call duration timer begins for CDR generation associated with the answered call.

In flow item 316, the Star Switch momentarily thereafter disconnects the call by issuing a SIP BYE command in the backward direction, which the GMSC/SBC translates into ISUP REL (Release) to instruct MSC 301 to release the call, which returns the call to an ON HOOK state. Such hook flash signaling is implemented via lifting the receiver to be OFF HOOK (e.g., answered), and then momentarily thereafter replacing the receiver back to be ON HOOK (e.g., released).

In flow item 317, on disconnecting the call, the MSC 301 responds with ISUP RLC (Release Complete), which is translated at the GMSC/SBC 304 into an ISUP 200 code and transmitted to the Star Switch to close the uplink dialog 324. In flow item 318, if CDR generation was indicated, upon issuing SIP 200/OK, the MSC 301 completes the call data recording (CDR). The resultant CDR may record a zero or one second call duration. The uplink dialog 324 may be collectively referenced herein as a "Ring Flash Hook" signaling protocol 324, in which user A as the caller receives an instant ring, followed by a momentary connect and disconnect (OFF/ON Hook Flash), clearing the call and displaying a 0:00 second call duration on the caller display. While the RBT may provide an auditory confirmation to user A of the placed call, such flash zero second call duration from the call that instantly rises and drops is able to provide a visual confirmation to user A that the request was serviced to completion, that the call is being placed to user B via the switching node (e.g., Star Switch 305). While the uplink dialog 324 may occur in sequence, the downlink dialog 325 may be signaled in parallel.

Referring again to flow item 313, on receiving the Uplink SIP INVITE from the GMSC/SBC 304, the Star Switch 305 may be configured to invoke the downlink dialog 325 by issuing SIP INVITE in the forward direction to SBC/GMSC 306, with the first user mobile device 300 of user A set in the From: header, and the second user mobile device 308 of user B set in the To: Header (and in the SIP Uniform Resource Identifier (URI), the SIP addressing schema character string identifying a call recipient). If the second user mobile device 308 of user B is currently roaming (e.g., attached) on the same network as the first user mobile device 300 of user A, then SBC/GMSC 306 and GMSC/SBC 304 are typically the one and the same gateway.

In flow item 320, the SBC/GMSC 306 is configured to translate the SIP INVITE into ISUP IAM to route the call toward the servicing destination MSC 307, which in turns pages and locates the second user mobile device 308 of user B to setup the call through control channel signaling. In flow item 321, when the second user mobile device 308 of user B is alerted to the incoming call, the MSC 307 signals ISUP ACM/CPG, alerting in the backward direction to SBC/GMSC 306, which translates into a SIP 180/RINGING signal sent to the Star Switch 305. In flow item 322, on receiving ringing indication, the Star Switch 305 responds with SIP CANCEL in the forward direction, which is translated into ISUP REL at SBC/GMSC 306 and sent to the MSC 307. The MSC 307 then releases the call. On releasing the call, the Star Switch 305 has successfully deposited the Calling Line Identity (CLI) of the first user mobile device 300 of user A at the second user mobile device 308 of user B, which in turn is configured to display a resulting missed call from the first user mobile device 300 of user A.

In flow item 323, the MSC 307 is configured to acknowledge the call release by signaling ISUP RLC in the backward direction to SBC/GMSC 306, which in turns transmits a SIP 200 code backward to the Star Switch 305. The SBC/GMSC 306 then may transmit a SIP 487/TERMINATION code to the Star Switch 305 to signal dialog termination. The Star Switch 305 is configured to acknowledge termination by sending a SIP ACK code to the SBC/GMSC 306, which may complete the flash protocol associated with the downlink dialog 325.

In an Analog Synchronous Ringing scheme establishing a direct end to end connection between devices of users A and B, where user A dials user B and waits for the destination to ring before disconnecting, the entire transaction may take, for example, between 5 and 15 seconds. During this synchronous transaction period, the device of user A may consume scarce Radio Control Channels. In the Digital Asynchronous Ringing protocol described herein, the device of user A is signaled and switched independently from signaling and switching to the device of user B to reduce an amount of time such Radio Control Channels are consumed. In presenting preemptive RBT to user A and instantly disconnecting the call, the first user mobile device 300 of user A may be switched ON/OFF the air in just 1 second on the uplink, since the second user mobile device of user B is signaled independently on the downlink, which assists with respect to Busy Hour Call Attempts (BHCA). BHCA is an industry metric quantifying the number of call attempts a network can process during the Busy Hour. The Star Flash Protocol described herein may reduce a Call Hold Time (CHT) from, on average, 10 seconds down to just 1 second to recover vast originating wireless spectrum availability and airtime. In embodiments, such spectrum recovery may deliver 10×BHCA, permitting an order of magnitude more calls to be signaled utilizing the same wireless spectrum (e.g., radio access network (RAN)).

Figure 3B:
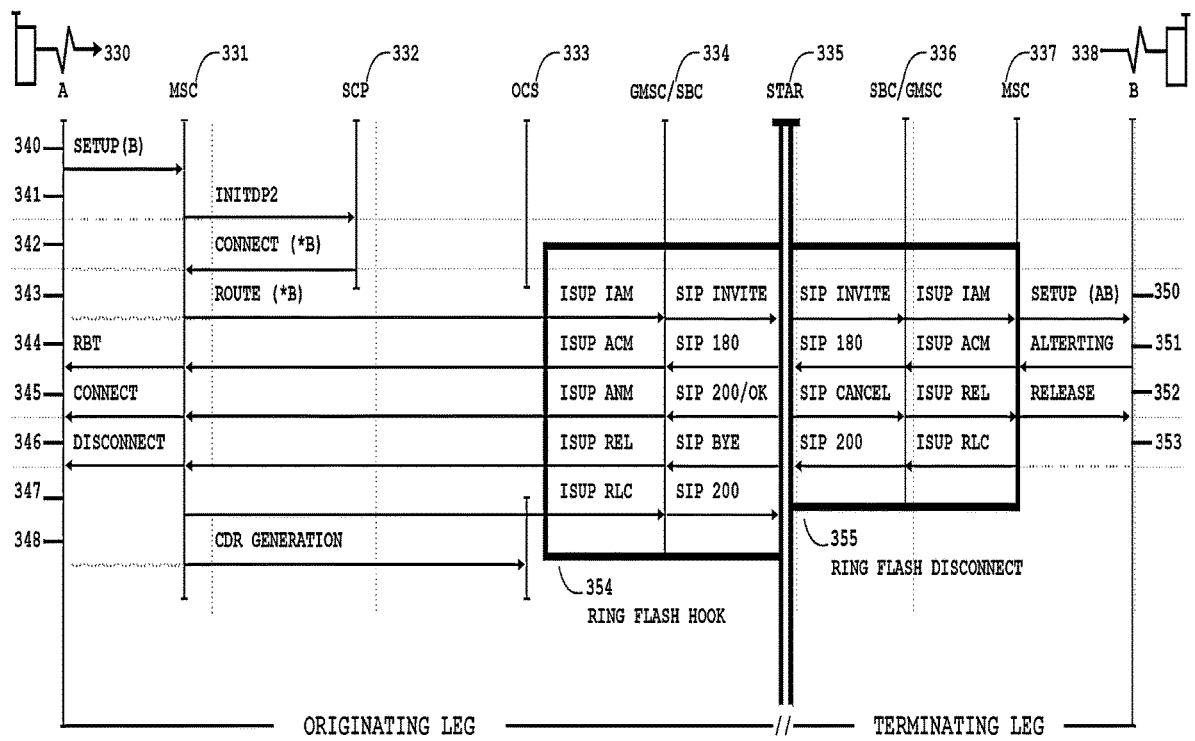
FIG. 3B schematically depicts a control scheme illustrating a sequential step ladder structure utilizing the methods of FIG. 1B and FIG. 2, according to one or more embodiments shown and described herein.

Referring to FIG. 3B, a control scheme illustrating a sequential step ladder structure utilizing the methods of FIG. 1B and FIG. 2 is shown. In flow item 340, the first user has a balance-independent SIM card account associated with the first user mobile device 330 (e.g., an embodiment of the first user mobile device 820) that does not require or incur airtime cost and dials a telephone number of the second user mobile device 338 (e.g., an embodiment of the second user mobile device 824) of user B. The first user mobile device 330 of user A is configured to transmit upon such dialing a call setup to the servicing MSC 331. The setup message contains the mobile address signals of user B in addition to other call parameters. The MSC 331 enters the Originating Basic Call State Model (OBCSM) encountering the Initial Detection Point (INITDP).

In flow item 341, the INITDP opens a call control dialog with Star Service Control Point (SCP) 332, the address of which is recorded in the SIM subscription information in the MSC/VLR 331 (e.g., as Originating Camel Subscription Information CAMEL O-CSI). In a CAMEL O-CSI embodiment, the MSC 331 has an associated gsmSSF (Service Switching Function), and the SCP is referred to as the gsmSCF (Service Control Function). The Star SCP 332 short circuits and does not require a credit verification for the account associated with the first user mobile device 330 of user A, which might otherwise query an Online Charging System (OCS) 333 to determine whether an account associated with user A has sufficient credit to complete the call. While SCP 332 and OCS 333 are depicted as separate nodes, they may be the one and same logical or physical node, embodying both call and billing control.

In flow item 342, a Star SIM call (e.g., balance-independent SIM card provisioned with zero airtime and serviced with Star IN logic as described herein) has no billing requirement, and the Star SCP 332 short circuits billing verification as described herein to directly and automatically modify the B party address with a prefix identifying the Star Switch 335 and instruct the MSC 331 to connect the call using the supplied modified address. Reference to "Star," "Star Sim," or "Star IN logic" as described herein may utilize a star (*) routing prefix or utilize alternative routing prefixes to progress through the modified prefix protocols as described herein. In flow item 343, the MSC 331 is configured to perform a routing lookup on the prefix to determine a trunk/route to the Star Switch 335, which may be hosted in the Cloud, and transmit an ISUP IAM to GMSC/SBC 334.

Flow items 344-353 of FIG. 3B operate similarly to flow items 314-323 of FIG. 3A. Further, the uplink dialog 354 and downlink dialog 355 operate similar to the uplink dialog 324 and downlink dialog 325 of FIG. 3A. FIGS. 3A and 3B thus differ in that FIG. 3B excludes a credit verification using OCS 333 in FIG. 3B, whereas FIG. 3A requires the credit verification during the call setup. Thus, billing nodes such as OCS 333 may be bypassed and not stressed by applications not requiring billing verification during the initial call setup as in FIG. 3B.

The signaling protocols with respect to the uplink dialogs 324, 354 and downlink dialogs 325, 355 of FIGS. 3A and 3B are further respectively described in FIGS. 4A and 4B, which tabulate source code level translation sequences between ISUP and SIP protocols for the uplink and downlink legs.

Referring to FIG. 4A, a control scheme for an originating flash hook protocol for the control schemes and uplink dialogs 324, 354 of FIG. 3A or 3B is shown. FIG. 4A illustrates an ISUP to SIP uplink signaling embodiment. Column 400 is representative of an originating network operator as a carrier, which receives the zero airtime call request as described herein. Column 401 is indicative of the signaling direction with respect to the carrier of Column 400. Column 402 is representative of the signaling conducted by the Star Switch 305, 335 of FIGS. 3A, 3B. Column 403 is representative of a delta time (e.g., change in time) that elapses between a previous and current signal. Column 404 is indicative of notative commentary associated with flow items 405-410 described below.

In flow item 405, on receiving a call setup request from the first user mobile device 300, 330 of user A addressed to the second user mobile device 308, 338 of user B, and after encountering or short circuiting a credit verification as described herein respectively with respect to FIGS. 3A and 3B, the originating network applies a routing prefix (such as *) to the mobile address of the second user mobile device of user B and routes the call to the Star Switch signaling ISUP IAM (e.g., A,*B) in the forward direction (e.g., carrier EGRESS in Column 401) via the Gateway MSC/SBC 304, 334. On receiving the ISUP IAM, the GMSC/SBC 304, 334 translates the signal into SIP INVITE (A,*B) in Column 402 and transmits the signal to the Star Switch 305, 335.

In flow item 406, on receiving the SIP INVITE, the Star Switch 305, 335, may respond with a SIP 100/TRYING signal in the backward direction (e.g., carrier INGRESS in Column 401) to arrest an INVITE timeout. A zero (0) milliseconds (ms) delta between receiving the INVITE and responding with the 100/TRYING is illustrative of an immediate response. The GMSC/SBC 304, 334 may translate SIP 100/TRYING into ISUP ACM sent in the backward direction towards the MSC 301, 331.

In flow item 407, substantially simultaneously, the Star Switch 305, 335 may be configured to transmit SIP 180/RINGING in the backward direction to the first user mobile device 300, 330 of user A to signal to the MSC 304, 334 that the destination of the second user mobile device 308, 338 of user B is being alerted. On receiving the SIP 180/RINGING, the GMSC/SBC is configured to transmit an ISUP CPG ALERTING signal in the backward direction to the Carrier MSC. ISUP CPG/ALERTING presents a RBT (ring-backtone) to the caller (e.g., user A of the first user mobile device 300, 330). Whether 180/RINGING is signaled alone or in conjunction with 100/TRYING, such an immediate response delivers an instant Post Dial Delay (PDD) response, herein termed a zero PDD.

In flow item 408, after responding with SIP 180/RINGING, the Star Switch 305, 335 may be configured to pause, such as for 1000 ms, to permit the ringing presentation as the RBT to user A. The 1000 ms delta may be shortened or extended to control ringing duration at the first user mobile device 300, 330 of user A. If native carrier CDR generation is required on the originating MSC 301, 331 as described herein, the Star Switch 305, 335 may then go OFF HOOK (e.g., be answered) by signaling SIP 200/OK in the backward direction to the GMSC/SBC, which in turn translates the signal into the ISUP ANS message. On receiving the ISUP ANS message, the originating MSC 301, 331 begins a call duration recording timer for CDR generation.

In constructing the SIP 200/OK response, which establishes a Realtime Transport Protocol (RTP) media stream, the Star Switch 305, 335 may blackhole the media by specifying IP address 0.0.0.0 in the SDP connection address line (e.g., c=IN IP4 0.0.0.0). This zero IP address has the property that packets sent to it will never leave the host that transmits them and rather are simply discarded (e.g., black holed). In blackholing the media sent from the carrier MSC/GMSC, the Star Switch 305, 335 forgoes the need to support the more bandwidth intensive media packets, enabling the Star Switch 305, 335 to operate entirely within the SIP signaling domain at scale.

In flow item 409, after going OFF HOOK (e.g., the call being answered), the Star Switch 305, 335 may shortly return to an ON HOOK state (e.g., the call being released) by signaling SIP BYE to the carrier, which the GMSC/SBC translates into ISUP REL, releasing the call and closing the CDR ticket. A delta less than 400 ms, catering for signaling latency, may ensure that a CDR is recorded with a sub 500 ms duration timer. The call duration timer may round up or down to the nearest second, such that signaling OFF/ON HOOK within this sub-second window generates a zero or one second CDR.

Even if CDR generation was not required, the Star Switch 305, 335 still is configured to signal SIP BYE to terminate the call rather than terminating a call using other SIP 4XX signals, such as user busy (SIP 486) or call terminated (SIP 487). Even with use of a BYE response so early on in a call setup, the Star Switch 305, 335 has already matured the call into a dialog by signaling SIP 180/RINGING, which necessarily incorporates a SIP To: Tag. Per SIP RFC, dialogs are created through the generation of non-failure responses to INVITE requests. Within the SIP specification embodiments, only 2XX and 101-199 responses with a To tag, may establish a dialog, and dialog establishment permits a UAS to respond with BYE, even though the SIP BYE may be signaled prior to receiving a SIP ACK (Acknowledgement) to a SIP 200/OK when the latter is signaled. Use of SIP BYE may instantly and cleanly clear the call and display a duration of 0:00 seconds on the first user mobile device 300, 330 of user A, which assists to deliver a visual confirmation to user A that the call was serviced to completion.

In flow item 410, on receiving the ISUP REL, the MSC 301, 331 releases all associated call resources and acknowledges termination by sending a release complete ISUP RLC message in the forward direction, which the GMSC/SBC 304, 334 translates into SIP 200 (with a Cseq BYE header field). On receiving the SIP 200 confirmation, the Star Switch uplink dialog 324, 354 completes.

In embodiments, native CDR generation on the originating carrier MSC 301, 331, permits independent carrier audited reconciliations between AB flashes from user A to user B and any BA callbacks from user B to user A. As a non-limiting example, where Tx represents a datetime stamp, TO may indicative of a zero airtime user A dialing user B at a datetime TO. The CDR date-time stamp may incorporate at least YYYYMMDDHHMMSSMMM, where YYYY is the current year, MM the current month, DD the current day, HH the current hour, MM the current minute, SS the current second and MMM the current millisecond.

In utilizing HOOK FLASH (OFF/ON HOOK) signaling as disclosed herein, the Star Switch 305, 335 commands the MSC 301, 331 to generate a CDR recording the flash communication between the first user mobile device 300, 330 of user A and the second user mobile device 308, 338 of user B at TO for a duration of 0 or 1 seconds, which generates an Originating CDR that may be titled (e.g., labeled and tracked) as A*B-T0D0. All such flash signaling generated CDRS may collectively describe the Star CDR Set.

In one embodiment, the Star prefix may be translated (e.g., mapped) into the associated Trunk X routing code, and as such the CDR would be recorded as AXB-TD, where X is the associated routing code. The Originating CDR is thus one of a plurality of call data recording codes that may be tracked to the audit and reconcile the call charges to the second user mobile device 308, 338 of user B upon callback as described herein.

T1 may be indicative of a timestamp associated with the user B returning the ring by calling back user A at datetime T1. By way of example, and not as a limitation, user A may answer the call and engages in dialog with user B for a duration of 90 seconds. This switched call may then be billed to and paid for by user B through generation of an originating and a terminating CDR that may be titled as BA-T1D90 as another one of the plurality of call data recording codes.

T2 may be indicate of a timestamp associated with user B returning a second call back to A at a datetime T2. For example, user A may answer the call and engage in further dialog with B for a duration of 120 seconds, wherein the call generates another originating and terminating CDR that may be titled as BA-T2D120 as another one of the plurality of call data recording codes.

A Carrier A may utilize the titles to calculate a revenue generated by the flash call ping of user A to user B (e.g., A*B-T0) by reconciling all callback CDRS of calls returned from user B to user A (e.g., BA-Tx) against the Star CDR Set, within a specified window of time. As a non-limiting example, to calculate all callbacks received within 1 hour of A*B-T0, Carrier A may extract and sum call durations Dy for any BA-Tx CDR where Tx-TO is less than or equal to 60 minutes (e.g., 1 hour). For reconciling callbacks received within other periods of time, such as 2 hours, 12 hours, etc., Carrier A may similarly sum all durations Dy for all Tx-TO less than or equal to that other period of time. As another non-limiting example and in embodiments, the CDR reconciliation, on the A*B flash communication at TO, may return two calls BA-T1D120 and BA-T2D90, totaling 210 seconds.

Referring to FIG. 4B, a control scheme for a terminating flash hook protocol for the control schemes and downlink dialogs 325, 355 of FIG. 3A or 3B is shown. FIG. 4B illustrates a SIP to ISUP downlink signaling embodiment. Column 440 is representative of signaling at the Star Switch 305, 335 controlling the downlink dialog 325, 355. Column 441 is indicative of the signaling direction with respect to the terminating Carrier of Column 442. Column 442 is representative of the signaling translation performed at the Carrier Gateway. Column 443 is representative of the delta time that elapses between a previous and the current signal, and Column 444 is indicative of notative commentary associated with flow items 445-449 described below.

In flow item 445, the Star Switch 305, 335 is configured to extract the address signals from the INVITE received on the Uplink and initiate a downlink call in the forward direction (e.g., Carrier INGRESS in Column 441) to the terminating carrier gateway SBC/GMSC 306, 336 using the SIP INVITE addressed from A to B. Determining the route required to setup the call may include a GMSC Global Title Translation to determine the user B HLR, querying the B HLR for the current destination MSC/VLR address to which user B is attached, receiving from the HLR the MSC address and Mobile Station Roaming Number (MSRN), and paging and locating the second user mobile device of user B as cellular events. The GMSC is configured to translate the SIP INVITE into ISUP IAM towards the destination MSC/VLR.

In flow item 446, the GMSC is configured to respond with SIP 100/TRYING in the backward direction to the Star Switch 305, 335 to arrest an INVITE timeout. While FIG. 4B shows the 100/TRYING following ISUP IAM, this is merely one illustrative embodiment to show that INVITE is translated and mapped into ISUP IAM. A GMSC/SBC may respond with SIP 100/TRYING on receiving an INVITE. In embodiments, any call progressing signals (SIP18X) that may precede SIP 180 are omitted for clarity.

In flow item 447, on receiving notification that the second user mobile device 308, 338 of user B is ringing, the MSC 307, 337 sends ISUP CPG/ALERTING in the backward direction to the GMSC 306, 336, which the GMSC translates into SIP 180/RINGING and sends to the Star Switch 305, 335. In flow item 448, on receiving SIP 180/RINGING, the Star Switch 305, 335 may instantly respond with SIP CANCEL in the forward direction to the GMSC 306, 336, which commands the call to be released. The GMSC 306, 336 may translate this command into ISUP REL and send the translated command to the MSC 307, 337.

In embodiments, an immediate zero (0) ms delta response may deliver a flash ring on the second user mobile device 308, 338 of user B, which may simply flash the call on the device display of the second user mobile device 308, 338 with or without emitting an audible ring. The associated delta time may be extended, such as, for example, to 1000 ms, to permit time for an audible ring alert. For example, a 1000 ms delta may permit delivery of one ring whereas a 0 ms delta may permit delivery of zero rings and instead flash a missed call alert onto the display of the second user mobile device. Combinations of ringing and flashing alerts may be utilized. In one embodiment, such a delta signaling timing parameter may be programmatically switched between 0 ms and 1000 ms based on a time of day. The delta may be set to 1000 ms during daylight hours to emit an audible ring and set to 0 ms during evening and nighttime to silently flash ring and not disturb the recipient. Such a dynamically timed flash signaling embodiment may be able to deliver a virtual flashlight feature that is switched off during the day (permitting ringing the device) and on during the night (permitting flashing the device).

In flow item 449, on releasing the call, the MSC 307, 337 is configured to transmit ISUP RLC in the backward direction to the GMSC 306, 336, which in turn translates this into SIP 200 (Cseq: CANCEL) transmitted backwards to the Star Switch 305, 335. GMSC may then finalize the dialog sending a SIP 487/TERMINATED signal in the backward direction to the Star Switch 305, 335. The Star Switch 305, 335 may then acknowledge the termination with SIP ACK in the forward direction to complete the downlink dialog 325, 355.

In an embodiment, the switching systems and methods described herein may operate on a parallel path to a positive balance or prepaid account system. Such an account system may be predicated on repeated airtime replenishment. By permitting a balance-independent SIM card to be serviced independently from a prepaid SIM card, as disclosed, may preserve a prepaid insufficient credit announcement to prompt a prepaid caller to replenish their account.

Figure 5:
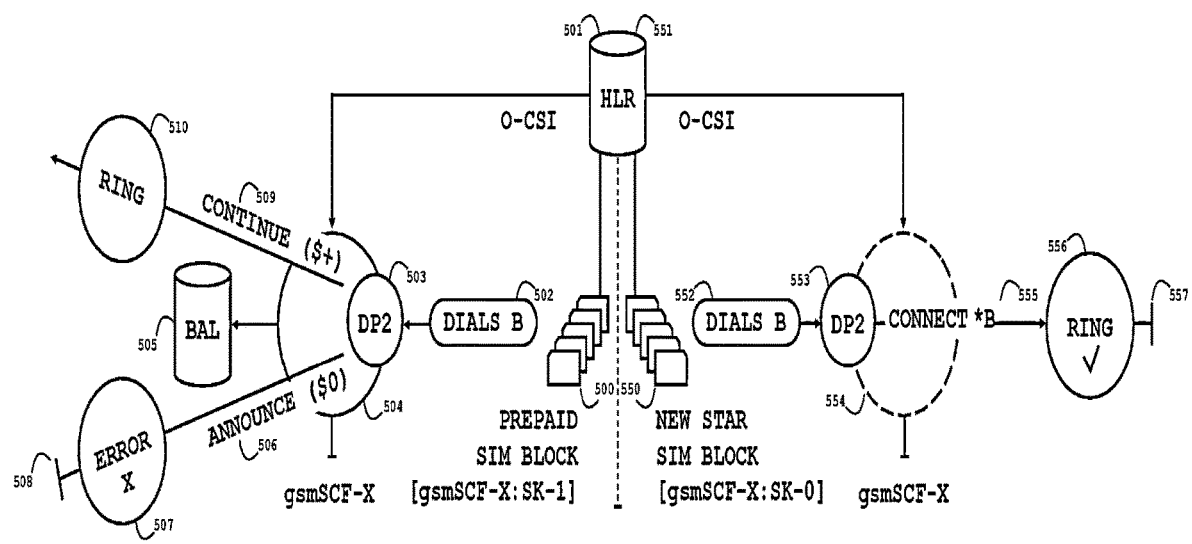
FIG. 5 schematically depicts a parallel architecture utilizing the balance-dependent SIM card and the balance-independent SIM card of the systems of FIG. 1A and FIG. 1B or of the zero charge SIM card system of FIG. 1A, according to one or more embodiments shown and described herein.

Such a parallel circuitry embodiment is further described in greater detail blow with respect to FIG. 5. FIG. 5 depicts a service architecture permitting a balance-independent SIM card and existing prepaid SIM card to be registered together and yet serviced separately. While the architecture depicts a single HLR and optionally multiple gsmSCF nodes, multiple HLRs and a single gsmSCF may be utilized. The SIM subscriber data stored in the HLR, rather than the HLR and the gsmSCF itself, may enable Star SIM calls to invoke the zero charge controlling service logic as described herein.

Thus, term "circuitry" herein is to be interpreted in a broader logical context of communication paths (such as communication path 802 of a zero charge telephony protocol system 800 described in greater detail further below) rather than narrower physical context (e.g., of analog design and physical wires) and may incorporate wired and/or wireless communications. In an embodiment, a single intelligent controller may service both the balance-independent (e.g., star) SIM card and the balance-dependent (e.g., prepaid) SIM card and associated subscribers while isolating balance-independent SIM card control from prepaid SIM card control.

In embodiments herein, SIM cards may be provided on a cellular network, and the HLR may be populated with the associated subscriber data. Further, Intelligent Networks (IN), such as CAMEL and O-CSI data models may be utilized. CSI contents may include gsmSCF Address, Service Key (SK) and Default Call Handling indicator. The gsmSCF is used to identify the CSE (CAMEL Service Environment) to be used for service interaction. The Service Key is a reference to the subscriber Operator Specific Service (OSS), which is used to identify the service logic to be invoked at the gsmSCF. Thus, the SK is used to address the desired Service Logic Program Instance (SLPI) within the gsmSCF. Each Service Key may also have an associated default call handling indicator.

Default call handling may specify the default call treatment (e.g., RELEASE, CONNECT, CONTINUE) under certain conditions. In one embodiment, the default call handling performs the Service Logic as disclosed, where the mobile address of user B is modified to include the routing prefix followed by a CONNECT command to permit the network to invoke the disclosed flash signaling as the default call handling procedure. Such flash signaling permits a call to be serviced under certain conditions (e.g., call gapping during high call volume) rather than failing to service a call.

SIM cards may have associated subscription information stored together with SIM authentication data, such as International Mobile Subscriber Identity (IMSI) and Secret key (value Ki) used by the GSM A3A8 Comp128 authentication algorithms. The architecture in FIG. 5 focuses on the IN controller node network address and associated Service Keys assigned to control the originating call setup Service Logic described herein.

SIM blocks may describe a range of contiguous IMSI that may be easily allocated with the same subscription profile in an HLR. It is contemplated by and within the scope of this disclosure that physical SIM cards, electronic SIM cards (eSIM), or combinations thereof may be utilized. SIM subscription information may be populated into the HLR by methods understood to those of skill in the art, such as the network address of an originating Intelligent Network Service Control Point, Service Keys and Trigger Detection Points.

The SIM block of the balance-independent SIM card may be provisioned with an alternate IN node address, or the same node address and a different Service Key, stored in the HLR O-CSI (Originating Camel Subscription Information) data, which is downloaded to the servicing MSC/VLR. Such data binds all originating calls from the balance-independent SIM card to the assigned Control Function and Service Logic Program Instance (SLPI), per the CAMEL MSC/gsmSSF call setup control and, similarly, per IN INITDP and associated MSC/SCP MAP dialogs.

Shunting the balance-independent SIM card associated call setups away from a primary prepaid IN node, or invoking a Star SLPI on the prepaid node using a distinct Service Key stored in the HLR subscription record, permits escaping and bypassing billing and associated billing nodes. Such a billing bypass function forgoes a credit verification to automatically, directly, and universally modify the called party address with a prefix that routes the call to the Star Switch on issuing CONNECT with modified arguments (e.g., a modified mobile destination address, incorporating a routing prefix to the called party number).

Hence, while a call that has sufficient credit may be commanded by an IN node to CONTINUE unmodified, on detecting insufficient credit, the IN node may continue on to modify the called address to include a routing prefix to the Star Switch and issue a CONNECT command (rather than a DISCONNECT, REJECT, AUTHORIZATION FAIL, RELEASE or similar IN command), commanding the MSC to continue with the call on the now modified address prefix. The MSC then reroutes the prefixed call, on a routing entry lookup and automated translation using the customized connection logic described herein, to direct the call to the Star Switch 305, 335 for signaling per the disclosed methods.

Referring to FIG. 5, as described above, a parallel architecture utilizing and provisioning the prepaid SIM card and the balance-independent (e.g., star) SIM card of the dual SIM card system of FIG. 1A and of FIG. 1B is shown. While some embodiments may have an allocation to physical nodes different from that shown, the physical separation of the logic shown does not affect the modelling disclosed. Thus, the Star gsmSCF is circled with a dotted rather than a solid line to indicate logical rather than physical entity separation. The prepaid SIM card and the balance-independent SIM card may have the same CSI gsmSCF addresses with distinct Service Keys, SK1 and SK0, which respectively invoke a different service logic.

A prepaid SIM card parallel architecture is shown on the left side of FIG. 5. In flow item 500, a plurality of existing prepaid SIM cards are provisioned with O-CSI data including a gsmSCF node address X (gsmSCF-X) and Service Key 1 (SK-1). A Prepaid Service Key value equal to "1" is merely illustrative and may be any suitable value. In flow item 501, the Prepaid SIM O-CSI subscription data is stored in an HLR and is propagated towards the servicing MSC/gsmSSF on SIM registration and attachment to the network.

In flow item 502, the user A associated with the prepaid SIM card uses the associated first user mobile device 300, 330 to dial the mobile address of the second user mobile device 308, 338 of user B. In flow item 503, the MSC/gsmSSF BCSM encounters the INITDP, and in flow item 504, the CAMEL MSC/gsmSSF initiates a dialog with service control function gsmSCF-X using Camel Service Key SK-1 to invoke the Prepaid Logic. Both gsmSSF and gsmSCF, while they may be physically distinct, are depicted as a single node with respect to flow item 504, though they may be independent nodes.

In flow item 505, a credit verification queries the current balance in an account associated with A. In flow item 506, if account A is determined to have insufficient credit to complete the call, the network plays a service announcement to the first user mobile device 300, 330 associated with account A of caller A (e.g., user A). This service may announce in flow item 507 that insufficient credit is available to complete the call, (e.g., "You have insufficient credit to complete the call"), and in flow item 508, the caller A is disconnected, and the connection is complete. However, in the alternative embodiments, rather than rejecting or disconnecting the call, rather than disconnecting the caller, the user may be presented with service options (e.g., an IVR menu), for example, to replenish their credit by purchasing additional airtime, requesting airtime credit, and/or or permitting the caller to request a collect call. In one embodiment, a CAMEL Specialized Resource Function (SRF), interlaces such an IVR menu into the call, by playing an associated announcement enumerating the service options, for example, announcing "Press 1 for Option one, Press 2 for Option two . . . " etc., and then performing digit collection (DTMF) to capture any user A selection(s).

In flow item 509, if account A is determined to have sufficient credit to complete the call, gsmSCF commands the MSC/gsmSSF to continue the call to the second user mobile device B. In flow item 510, if the second user mobile device B is available the call matures to ringing state permitting the recipient to answer.

On the right side, FIG. 5 depicts a parallel architecture for a balance-independent SIM card system. In flow item 550, a plurality of balance-independent SIM cards are provisioned with CSI data including gsmSCF node address X (gsmSCF-X) and Service Key 0 (SK-0). A zero balance Service Key value equal to "0" is merely illustrative and may be any suitable value. In flow item 551, associated STAR SIM O-CSI subscription data is stored in an HLR and is propagated towards the servicing MSC/gsmSSF on SIM attachment to the network.

In flow item 552, the user A associated with the balance-independent SIM card uses the associated first user mobile device 300, 308 to dial the mobile address of the second user mobile device 330, 338 of user B. In flow item 553, the MSC/gsmSSF BCSM encounters the INITDP, and in flow item 554, the CAMEL MSC/gsmSSF initiates a dialog with service control function gsmSCF-X using the Camel Service Key SK-0 to invoke the STAR Logic (e.g., zero balance connect through routing prefix modification). Both gsmSSF and gsmSCF, while may be physically distinct, are depicted as a single node in flow item 554, similar to the node in flow item 504, while now executing a different service logic.

In flow item 555, as described herein, credit verification is short circuited and not necessary for the balance-independent SIM card while bypassing communication with billing nodes. The gsmSCF modifies the B address with a routing prefix that addresses a Star Switch 305, 335 and commands the MSC/gsmSSF to connect the call using the modified address with the routing prefix as described herein.

In flow item 556, the Star Switch 305, 335 plays a ring-back-tone (RBT) to the first user mobile device 300, 330 of user A. Momentarily thereafter, in flow item 557, the caller (e.g., user A) is disconnected and the first connection is complete. Embodiments of the different service logic of flow item 504 to place the call to user B from the Star Switch 305, 335 is described in greater detail below with respect to FIGS. 6A-6B along with describing the dependencies between the HLR, SIM, CSI and SLPI in reference to FIGS. 6A-6B that present respective logical intelligent network views. FIG. 6C illustrates an embodiment of a quota based synchronous zero cost scheme, which is described in greater detail further below.

IN supports programmable service logic. An IN node, service control point (SCP) or service control function (SCF) can remotely command and control a Mobile Switch (MSC) at well-defined Points In Call (PIC) and trigger detection points (TDPs) encountered in the Basic Call State Model (BCSM). CAMEL is an IN protocol as known to those of ordinary skill in the art. As the CAMEL O-CSI is subscriber specific, different subscribers may subscribe to different CAMEL services. CAMEL is also an extensible platform that can host different service logic, for different subscribers and at different PICs, supporting different Operator Specific Services (OSS) on the same node. CAMEL permits remote SLPI invocation at the INITDP using Service Keys assigned to the SIM, and the methods and systems disclosed herein may leverage this CAMEL feature to host two mass market segments, prepaid users who have prepaid funds for airtime and/or zero balance users not providing any funds for airtime, on the same networking infrastructure. It is contemplated by and within the scope of this disclosure that such zero charge systems may be utilized in conjunction with post-paid accounts as well that are billed in a periodic cycle, such as where an account may be deactivated due to non-payment. INITDP may be invoked at a Detection Point 2 (e.g., DP2 Collected Information), where the O-CSI has been analyzed.

Intelligent Service switching logic invoked on CAMEL Service Keys may permit the balance-independent SIM cards as described herein to be hosted on the same platform yet serviced independently. A distinct Service Key assigned to the balance-independent SIM card is configured to invoke the associated SLPI implementing the disclosed billing short circuit, address modification, and CONNECT call handling algorithm. For example, where P is Prepaid, and S is Star (e.g., zero balance), the service logic may follow: (1) P SIM>gsmSCF-X+SK-1 INITDP=>P Service Logic SLPI-1; and (2) S SIM>gsmSCF-X+SK-0 INITDP=>S Service Logic SLPI-0.

Service collocation delivers important efficiencies and cost benefits to the operator. The same infrastructure can be utilized for servicing both an existing positive balance (prepaid) and a zero balance base without either impairing or encroaching on the other. Alternatively, gsmSCF-X may be physically distinct nodes, with addresses gsmSCF-1 and gsmSCF-0, rather than the same physical entity to completely isolate the service and the circuitry, in what may be described as a Network Abstraction suitable for a Mobile Virtual Network Operator (MVNO).

Figure 6A:
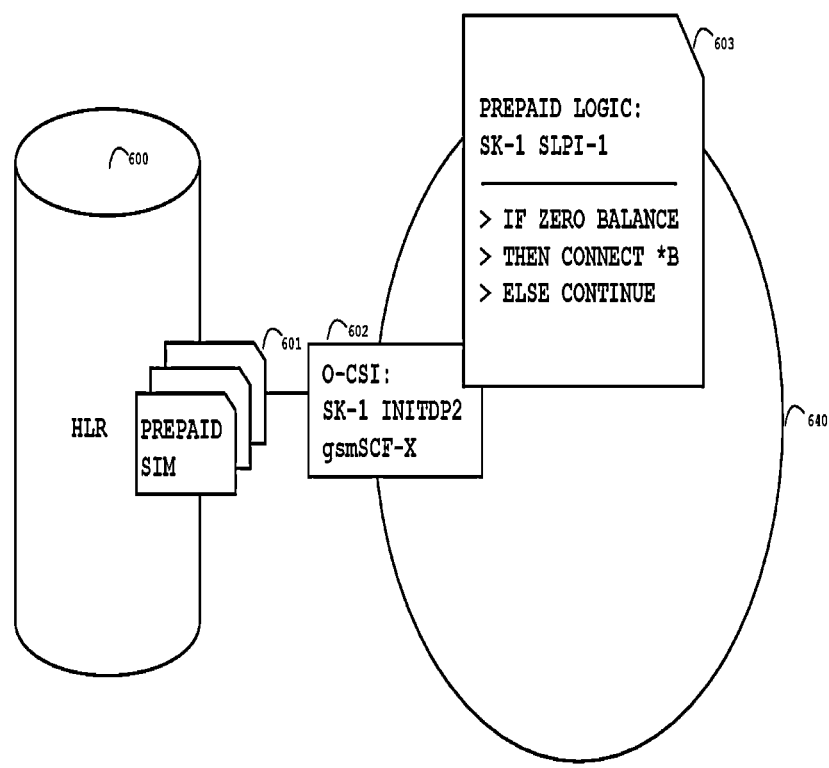
FIG. 6A schematically depicts a unified logic model of the balance-dependent and balance-independent service key logic for the methods of FIGS. 1A and 2, according to one or more embodiments shown and described herein.

Referring to FIG. 6A, a unified logic model of prepaid and zero charge service key logic for the methods of FIGS. 1A and 2 is shown. With reference to FIG. 6A which describes a unified prepaid and zero caller model, in flow item 600, the HLR stores subscriber profiles of positive balance or credit (prepaid) SIM cards. In flow item 601, the prepaid SIM cards are each associated with an account that stores a current airtime balance. In flow item 602, a prepaid SIM card has associated O-CSI data, which includes the gsmSCF address (gsmSCF-X) and INITDP Service Key (SK-1). While multiple service keys may be defined, controlling distinct service logic at different PICs, the illustrated embodiment shows a single SK applied to the INITDP DP Collected Information. In flow item 603, when a prepaid call is requested by a caller (e.g., user A), the MSC/gsmSSF enters the O-BCSM. On encountering the INITDP (DP2), the MSC/gsmSSF requests call control from gsmSCF-X (640), with SK-1. This invokes the Prepaid Service Logic Program Instance SLPI-1, which executes the illustrated conditional statement commanding the MSC as follows: (1) if the account associated with the caller A dialing an address of user B has insufficient balance or credit to complete the call; (2) then connect on a modified address of user B incorporating a star routing prefix to place the call to user B via the asynchronous switching node as disclosed; (3) else continue using the prepaid SIM card with sufficient balance or credit to complete the call to user B.

Such conditional logic is able to highlight a prepaid SLPI incorporating the disclosed script for zero balance prepaid calls to deliver a unified prepaid and prepaid zero balance controller to place calls even with a zero balance determination.

Figure 6B:
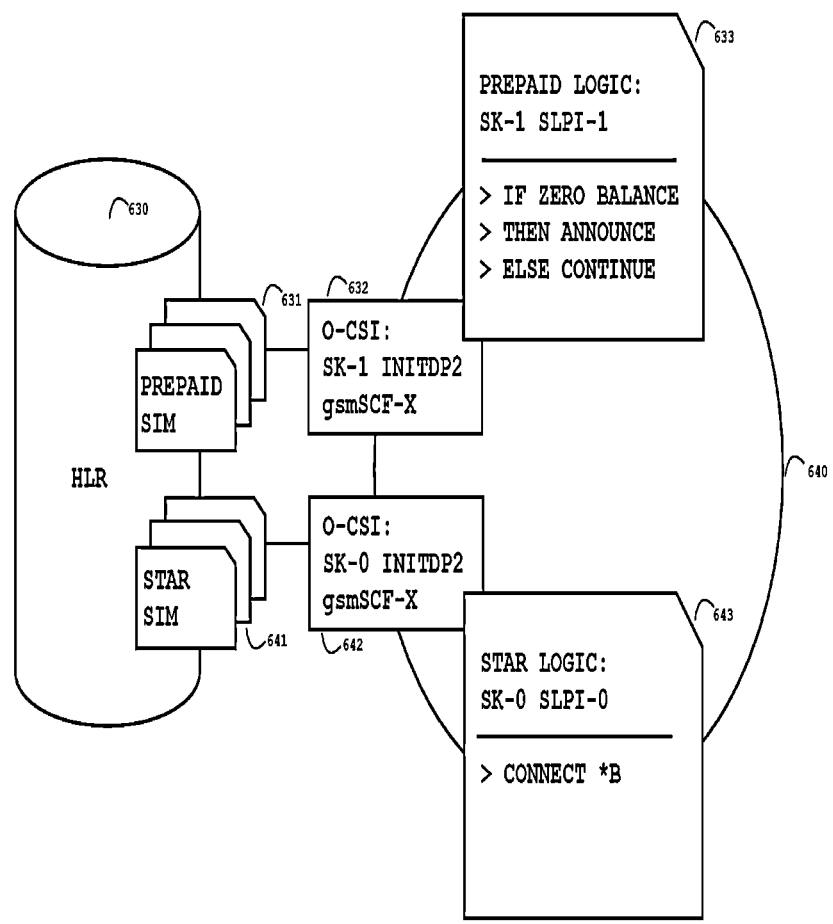
FIG. 6B schematically depicts a parallel logic model of balance-dependent and zero charge SIM card system utilizing service key logics for the methods of FIG. 1A or 1B and FIG. 2, according to one or more embodiments shown and described herein.
Figure 6C:
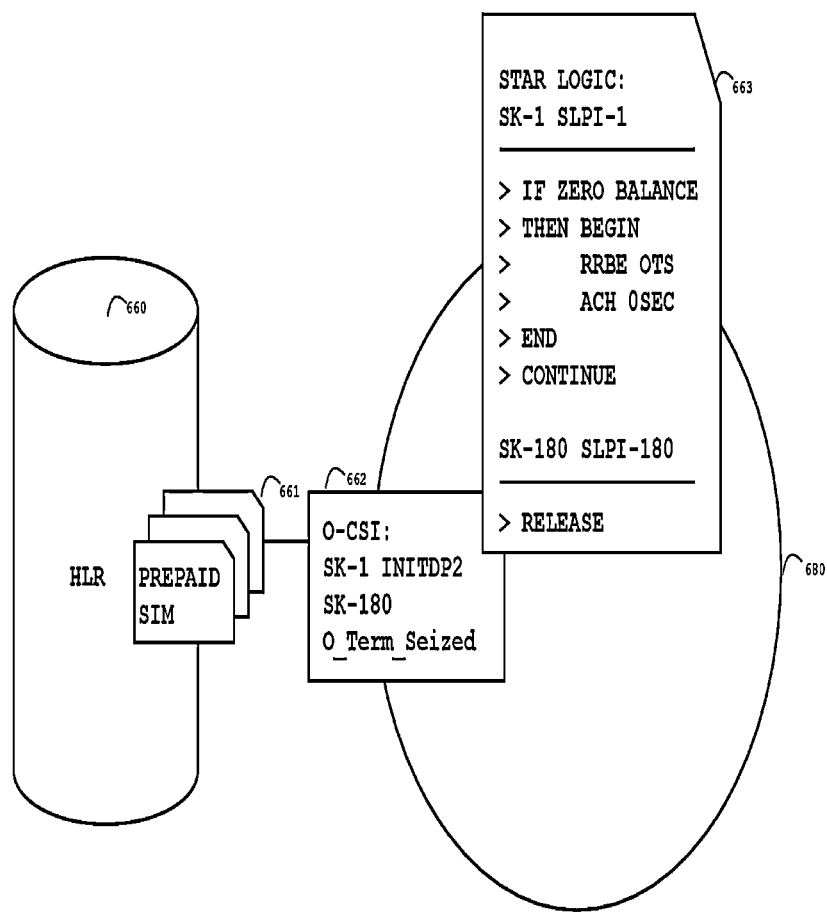
FIG. 6C schematically depicts a native logic model of a prepaid zero charge service key logic for a quota based synchronous zero cost scheme, according to one or more embodiments shown and described herein.

Referring to FIG. 6B, a parallel logic model for prepaid and star zero charge service key logics for the methods of FIGS. 1B and FIG. 2 is shown. FIG. 6B describes a collocated yet parallel switched prepaid and star zero caller model. In flow item 630, the HLR is configured to store both prepaid and star (zero balance) SIM subscriber profiles. In flow item 631, the prepaid SIM cards have an account which stores a current airtime balance. In flow item 632, the prepaid SIM card has associated O-CSI data, which includes the gsmSCF address (gsmSCF-X) and INITDP Service Key (SK-1). While multiple service keys may be defined, controlling distinct service logic at different PICs, the illustrated example shows a single SK applied to the INITDP (e.g., DP2 Collected Information).

In flow item 633, when a prepaid call is requested by user A attempting to call a mobile address associated with user B, the MSC/gsmSSF enters the O-BCSM. On encountering the INITDP, the MSC/gsmSSF requests call control from gsmSCF-X in flow item 640 with SK-1. This invokes the Prepaid Service Logic Program Instance SLPI-1, which executes the illustrated conditional statement commanding the MSC as follows: (1) if the account associated with the caller A (e.g., user A) has insufficient balance or credit to complete the call; (2) then announce insufficient balance or credit to user A; (3) else continue the call. Such conditional logic preserves Prepaid Service Logic SLPI-1, or other prepaid logic that may apply and is contemplated herein, for zero balance callers.

In flow item 641, the balance-independent SIM cards may perpetually be on zero balance. All outgoing calls from the balance-independent SIM card may be switched as per the disclosed signaling protocol to connect, the calls do not require billing verification during call setup as described herein. In flow item 642, the balance-independent SIM has an associated O-CSI record, which includes the gsmSCF address (gsmSCF-X) and associated INITDP (DP2 Collected Information) Service Key (SK-0). As with the prepaid SIM card described herein, multiple service keys may be defined, controlling service logic at different PICs, while the illustrated example shows a single SK applied to the DP.

In flow item 643, when a Star call is requested, the MSC/gsmSSF enters the O-BCSM. On encountering DP2 the MSC/gsmSSF requests call control from gsmSCF-X in flow item 640 with SK-0. This invokes the Star Service Logic Program Instance SLPI-0 which, as illustrated, executes the CONNECT command on the modified B address, incorporating a routing prefix addressing the Star Switch 305, 335. It is contemplated by and within the scope of this disclosure that other service logic incorporating the customized connection logic herein may be applied.

In describing an alternate Service Logic Instance with reference to FIG. 6C, a natively signaled flash communications embodiment forgoes the need to loop the call setup via a bespoke asynchronous Star Switching node. In this synchronous signaling embodiment, the disclosed methods execute along the native originating and terminating ISUP call setup path.

In such a native Star Service Logic embodiment, on supporting IN platforms, such as CAMEL Phase 4, the balance-independent SIM card is configured to assign an additional Service Key SK-180 to the EDP-R for servicing the O_Term_Seized (O_Alerting) trigger detection point. In flow item 660, the HLR is configured to store prepaid SIM card subscriber profiles. In flow item 661, the prepaid SIM cards each have an account which stores a respective current airtime balance. In flow item 662, each prepaid SIM card has an associated O-CSI record, which includes the gsmSCF address (gsmSCF-X) and associated INITDP (DP2 Collected Info) Service Key (SK-1). The O-CSI furthermore has a second Service Key (SK-180) associated with Trigger Detection Point O_Term_Seized (O_Alerting).

In flow item 663, when a prepaid call is requested by user A attempting to dial a mobile address of user B, the MSC/gsmSSF enters the O-BCSM. On encountering the INITDP, the MSC/gsmSSF requests call control from gsmSCF-X in flow item 680 with SK-1. This invokes the Prepaid Service Logic Program Instance SLPI-1, which executes the illustrated conditional statement. The associated conditional logic invokes an algorithm to deliver a disclosed flash ring signaling protocol excluding the bespoke Star Switch 305, 335 such that the star address prefix is no longer required.

As a non-limiting example, on encountering the INITDP and invoking the SLPI-1 service logic with associated SK-1, the gsmSCF executes a conditional statement that may be summarized as follows: (1) if user A has insufficient credit; (2) then begin (2a) RRBE (OTS), (2b) ACH (0SEC); (3) end; and (4) CONTINUE processing the call.

With respect to the RRBE (OTS) short hand notation, SLPI-1 requests and arms event reports on the BCSM, as a Request Report BCSM Event (RRBE), in particular, arming the O_Term_Seized (OTS) or O_Alerting Detection Point, as an EDP-R (Event Detection Point Request) so that the call is paused and the MSC requests instruction on encountering the Detection Point. On triggering, the EDP invokes SLPI-180 where the gsmSCF instructs the MSC to release the call as the second user mobile device of user B has been alerted through presenting a missed call at the second user mobile device as the destination device. By programmatically arming this alerting EDP for callers with insufficient credit, the controller can selectively disconnect ringing state for zero balance callers alone, without impacting callers with sufficient credit, which calls can ring indiscriminately until answered.

With respect to the ACH (0SEC) short hand notation, since the balance-independent SIM card has zero airtime credit, the gsmSCF Applies Charging (ACH) with a Maximum Call Duration Quota set to zero seconds (e.g., CAMEL maxCallPeriodDuration=0) and instructs the MSC to release the call when the quota is exceeded (releaseIfdurationExceeded=True). Such Zero Quota Release configuration instructs the MSC/gsmSSF to terminate the call on encountering a charge event, such as ANSWER, since the zero quota does not sustain a charge.

The quota is thus set to intentionally and instantly expire and exhaust the call at a charging onset, permitting the call to mature to ringing (e.g., signaling) while simultaneously preventing the call from progressing to speech (e.g., answering) that would otherwise incur a charge. In the latter instance, since the quota is zero, the MSC/gsmSSF is configured to instantly disconnect a connected call. The quota may also be set to any increment, e.g., zero to one seconds, for similar effect (e.g., 100 ms).

With regard to the CONTINUE command, the gsmSCF progresses to command the MSC/gsmSSF to CONTINUE with the call, thus permitting the call to continue even though it is set for instant disconnection on ringing detection or on answering.

With regard to a RELEASE command, on the MSC/gsmSSF receiving Alerting indication that the B device is ringing (ISUP ACM/CPG Alerting), the O-BCSM leads to the O_Term_Seized DP. Such action triggers the EDP-Request with assigned SK-180, where the gsmSSF suspends call processing awaiting instruction from the gsmSCF. SLPI-180, which services the EDP-R, commands the gsmSSF to RELEASE the call (CAP_Release_Call), thereby terminating the connection and completing the Downlink Flash Communication.

A distinction from FIGS. 6A and 6B in the natively signaled embodiment of FIG. 6C is that caller A remains on the line until such time as the remote party is alerted or on encountering another network condition (e.g., Network/User Busy). As such, this natively signaled embodiment presents a quasi-flash communications protocol since RBT presentation is based on synchronous signaling to the far end destination second user mobile device of user B. The Uplink communication is therefore coupled in the natively signaled embodiment to the Downlink communication, and consequently the signaling protocol has a longer Call Holding Time (CHT) than the protocols of FIGS. 6A and 6B. However, the synchronous signaling embodiment of FIG. 6C is configured to deliver a realtime ringing, and other network tones (e.g., user and network busy) and notifications to user A, along the natively switched call path, without looping the call setup and control via the disclosed Star Switch as required for FIGS. 6A and 6B. This distinction permits the gsmSCF to control and implement the disclosed Flash Communications Protocol natively, along a synchronous call path, without requiring a bespoke switching and signaling node (e.g., the Star Switch 305, 335).

The balance-independent SIM card described herein may have basic services provisioned, such as an ability to make outgoing (Originating) calls that are then switched and serviced per the flash signaling embodiments disclosed herein. While other services may be provisioned, these SIM cards may have a minimum number of features enabled. As a non-limiting example, voicemail services may be excluded as balance-independent SIM users expectantly await return calls, precipitated by the flash ring protocol, and as such would not require a voicemail feature.

Figure 7:
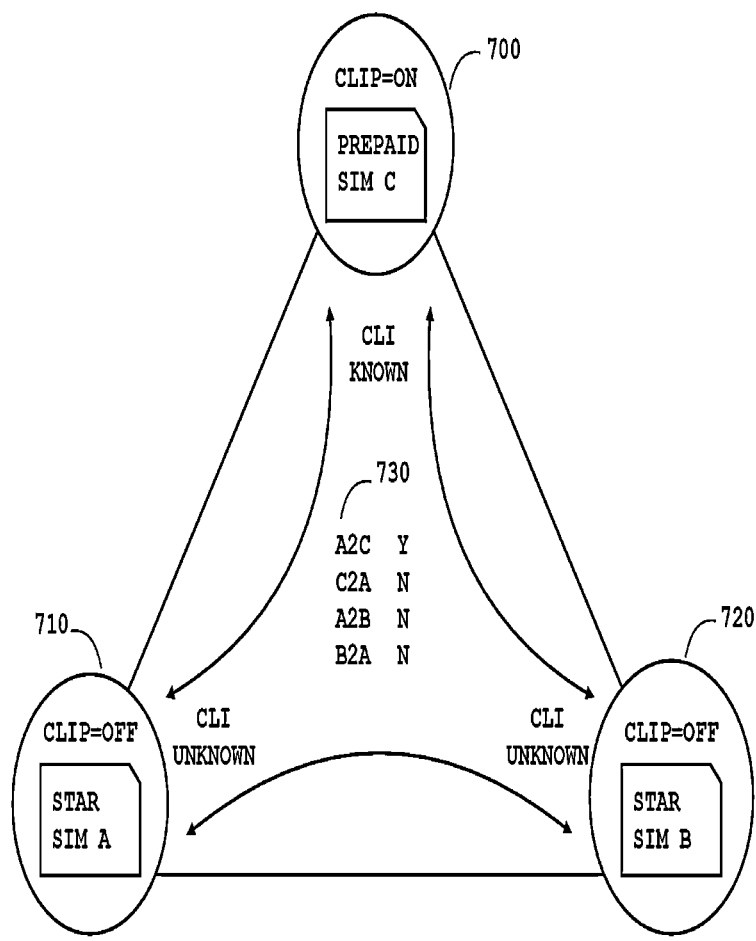
FIG. 7 schematically depicts an asymmetrical zero charge, and balance-independent SIM card CLI provision, according to one or more embodiments shown and described herein.

Referring to FIG. 7, an asymmetrical zero charge SIM card CLI provision is shown. Asymmetrical CLI is a feature configured to counterintuitively disable Calling Line Identity Presentation (CLIP) for the balance-independent SIM cards disclosed herein to intentionally mask who is calling back. As the balance-independent SIM card is predicated on reverse ringing, where a user pings another user for callback to reverse call charges to the other user upon callback, the system may be configured to permit these users to ping only those users (e.g., PING user to signal caller identity) who have prepaid and postpaid accounts, and who are thus able to return and pay for a call.

CLIP is a supplementary network feature that permits recipients to identify callers based on calling line identity. By disabling CLIP on balance-independent SIM cards in embodiments, and presenting all incoming calls as UNKNOWN, the zero charge systems herein prevents users from flashing each other, without placing any speech callbacks to convert pings to revenue generating callbacks. Notwithstanding the fact that disabling CLIP results in all incoming calls displaying UNKNOWN, such incoming calls may be highly anticipated and awaited and thus answered.

In flow item 700, a prepaid and postpaid SIM card user C may have CLIP enabled by default. In flow item 710, a balance-independent SIM card user A may have CLIP disabled, and in flow item 720 a balance-independent SIM card user B may have CLIP disabled. In flow item 730, the system determines if an identity matrix is showing when CLI is presented (Y/ES) and when it is suppressed (N/O) between a first user and a second user. For example, a call between user A and user C does not suppress the CLIP such that CLIP is enabled (A2C Y) while a call between user A and user B does suppress the CLIP such that CLIP is disabled (A2B N). Given such CLIP provisioning, balance-independent SIM card users A and B may transmit their calling identity when placing calls while not receiving a calling identity when receiving calls.

In embodiments, CLIP disabled (e.g., having CLI suppressed for incoming calls), together with no voicemail provision, may ensure that the zero balance user base cannot screen and divert calls without the network collecting revenue from at least one user. In embodiments, if balance-independent SIM user A wishes to have CLIP enabled, the user A may be required to pay an activation fee.

The systems and methods disclosed herein may service both prepaid users with zero airtime as well as new balance-independent SIM users who wish to place calls without any required prepaid or postpaid balance with the same flash signaling protocol. Prepaid systems are predicated on a cyclical topup, requiring users to purchase airtime when their balance is depleted. By isolating the balance-independent SIM call service control, either by assigning a new IN node to the SIM subscription or by assigning a new Service Key that invokes the Star SLPI logic, the prepaid option may remain intact and work in parallel to the balance-independent systems described herein.

Thus, balance-independent SIM card calls may be serviced and controlled independently from prepaid calls as described herein. Such a circuit isolating architecture permits the new zero balanced base of telecommunication users to be serviced according to the disclosed flash signaling methods without limiting option and further providing alternative options to a prepaid user base to place a call even with insufficient balance or credit.

In an embodiment, dialing a USSD service code (e.g., *123*#) can migrate a balance-independent SIM card to a prepaid SIM card to permit users to add credit to their account in order to pay for their own communication. In yet another embodiment, the balance-independent SIM can be automatically upgraded to a prepaid SIM card on receiving airtime transferred from another prepaid SIM card. Similarly, such an upgraded SIM can be automatically migrated back to a balance-independent SIM once such gifted airtime is depleted. In one such SIM migration, the balance-independent SIM Service Key (SK0) stored in the HLR CSI may be changed to the Prepaid Service Key (SK1), thereby invoking the prepaid rather than the balance-independent SLPI. In an alternate embodiment, where the controlling nodes are physically distinct, the gsmSCF address may be changed from balance-independent gsmSCF-0 to prepaid gsmSCF-1.

In another embodiment, a symbolic routing prefix such as the star symbol (*) addresses an internet hosted SIP Signaling Node, and any prefix that routes to any signaling node that commands control over the call setup process and progress may be utilized and is in the scope of this disclosure, including without limitation, an internal routing prefix and an SS7/ISUP signaling or switching node. In such an ISUP signaling embodiment, the disclosed originating and terminating flash ring protocols may be readily translated from SIP to ISUP as illustrated and disclosed herein.

Further, while embodiments described herein disclose ringing a destination device to deposit an originating calling line identity, other bearers and protocols may similarly ping and notify the called party on the Downlink communication. Alternate signaling embodiments may include, without limitation, pinging via Short Messaging Service (SMS), Multimedia Messaging Service (MMS), and/or Rich Communication Systems (RCS) messaging systems and/or via Internet messaging systems addressable on a telephone number (e.g., pinging via an application programming interface (API) to popular applications such as WhatsApp), and/or pinging via a Unstructured Supplementary Services Data (USSD) push and other data bearing protocols. Any discrete communication that can deliver user A information to the user B may be utilized.

While signaling the called party (e.g., user B) using a FLASH ring method is disclosed to momentarily ring and disconnect, the disclosed systems and methods are further configured to seamlessly hook a balance-independent (e.g., zero balance) call during the origination phase by modifying the called number with a routing prefix directing the call towards the switching node (e.g., Star Switch 305, 335) for processing. Consequently, any other originating or terminating protocol other than flash ringing utilizing the modification scheme may be similarly implemented.

Referring to FIG. 8, a zero charge telephony protocol system 800 for implementing a computer and software-based method to implement the zero charge SIM card protocols described herein is illustrated. The zero charge telephony protocol system 800 may be implemented along with using a graphical user interface (GUI) that is accessible at a mobile client device (e.g., a first user mobile device 820 and a second user mobile device 824), for example. The mobile client device may be a smart mobile device, which may be a smartphone, a tablet, or a like portable handheld smart device. The machine readable instructions may cause the zero charge telephony protocol system 800 to, when executed by the processor, interact with one or more SIM cards associated with the mobile client device of the user as described herein. The machine readable instructions may cause the zero charge telephony protocol system 800 to, when executed by the processor, interact with the one or more SIM cards to follow one or more control schemes as set forth in the one or more processes described herein.

The zero charge telephony protocol system 800 includes machine readable instructions stored in non-transitory memory that cause the zero charge telephony protocol system 800 to perform one or more of instructions when executed by the one or more processors, as described in greater detail below. The zero charge telephony protocol system 800 includes a communication path 802, one or more processors 804, a memory 806, a switch component 812 that may be asynchronous or synchronous, a storage or database 814, at least one SIM component 816, a network interface hardware 818, a first user mobile device 820, a network 822, and a second user mobile device 824. The various components of the zero charge telephony protocol system 800 and the interaction thereof will be described in detail below.

In some embodiments, the zero charge telephony protocol system 800 is implemented using a wide area network (WAN) or network 822, such as an intranet or the Internet, or other wired or wireless communication network that may include a cloud computing-based network configuration. The mobile client devices 820, 824 may include digital systems and other devices permitting connection to and navigation of the network, such as the smart mobile device. Other zero charge telephony protocol system 800 variations allowing for communication between various geographically diverse components are possible. The lines depicted in FIG. 8 indicate communication rather than physical connections between the various components.

As noted above, the zero charge telephony protocol system 800 includes the communication path 802. The communication path 802 may be formed from any medium that is capable of transmitting a signal such as, for example, conductive wires, conductive traces, optical waveguides, or the like, or from a combination of mediums capable of transmitting signals. The communication path 802 communicatively couples the various components of the zero charge telephony protocol system 800. As used herein, the term "communicatively coupled" means that coupled components are capable of exchanging data signals with one another such as, for example, electrical signals via conductive medium, electromagnetic signals via air, optical signals via optical waveguides, and the like.

As noted above, the zero charge telephony protocol system 800 includes the processor 804. The processor 804 can be any device capable of executing machine readable instructions. Accordingly, the processor 804 may be a controller, an integrated circuit, a microchip, a computer, or any other computing device. The processor 804 is communicatively coupled to the other components of the zero charge telephony protocol system 800 by the communication path 802. Accordingly, the communication path 802 may communicatively couple any number of processors with one another, and allow the modules coupled to the communication path 802 to operate in a distributed computing environment. Specifically, each of the modules can operate as a node that may send and/or receive data. The processor 804 may process the input signals received from the system modules and/or extract information from such signals.

As noted above, the zero charge telephony protocol system 800 includes the memory 806, which is coupled to the communication path 802, and communicatively coupled to the processor 804. The memory 806 may be a non-transitory computer readable medium or non-transitory computer readable memory and may be configured as a nonvolatile computer readable medium. The memory 806 may comprise RAM, ROM, flash memories, hard drives, or any device capable of storing machine readable instructions such that the machine readable instructions can be accessed and executed by the processor 804. The machine readable instructions may comprise logic or algorithm(s) written in any programming language such as, for example, machine language that may be directly executed by the processor, or assembly language, object-oriented programming (OOP), scripting languages, microcode, etc., that may be compiled or assembled into machine readable instructions and stored on the memory 806. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any computer programming language, as pre-programmed hardware elements, or as a combination of hardware and software components. In embodiments, the zero charge telephony protocol system 800 may include the processor 804 communicatively coupled to the memory 806 that stores instructions that, when executed by the processor 804, cause the processor to perform one or more functions as described herein.

Still referring to FIG. 8, as noted above, the zero charge telephony protocol system 800 may comprise the display such as a GUI on a respective screen of the mobile client devices 820, 824 for providing visual output and/or receiving input such as a dialed number on a touchscreen interface. The mobile client devices 820, 824 may include one or more computing devices across platforms, or may be communicatively coupled to devices across platforms, such as smart mobile devices including smartphones, tablets, laptops, and the like. The display on the screen of the mobile client devices 820, 824 is coupled to the communication path 802 and communicatively coupled to the processor 804. Accordingly, the communication path 802 communicatively couples the display to other modules of the zero charge telephony protocol system 800. The display can include any medium capable of transmitting an optical output such as, for example, a cathode ray tube, light emitting diodes, a liquid crystal display, a plasma display, or the like. Additionally, it is noted that the display or the mobile client devices 820, 824 can be communicatively coupled to at least one of the processor 804 and the memory 806. While the zero charge telephony protocol system 800 is illustrated as a single, integrated system in FIG. 8, in other embodiments, the systems can be independent systems and/or sub-systems.

The zero charge telephony protocol system 800 may comprise: (i) the switch component 812, which may be asynchronous as the Star Switch 305, 335 as described herein and (ii) the at least one SIM component 816, which may be a prepaid SIM card and/or a balance-independent SIM card as described herein. The at least one SIM component 816 may at least one subscriber identity module (SIM) card, which comprises an integrated circuit that securely stores an international mobile subscriber identity (IMSI) number and related key information used to identify and authenticate subscribers of smart mobile telephony devices. Each SIM card may also store contact information and its own unique serial number as an integrated circuit card identifier (ICCID), the IMSI number, security authentication and ciphering information, local network related temporary information, a list of accessible user services, a user password as a personal identification number (PIN), and a personal unblocking code to unlock the PIN. A card services provider may be able to identify and authenticate a SIM card to provide services, such as cellular and/or wireless data services to a device within which the SIM card is installed. The switch component 812 and the at least one SIM component 816 are coupled to the communication path 802 and communicatively coupled to the processor 804. The processor 804 may process the input signals received from the system modules and/or extract information from such signals.

Data stored and manipulated in the zero charge telephony protocol system 800 as described herein may be used to leverage a cloud computing-based network configuration such as the Cloud (e.g., a cloud server in a cloud network configuration utilizing cloud computing). The zero charge telephony protocol system 800 includes the network interface hardware 818 for communicatively coupling the zero charge telephony protocol system 800 with a computer network such as network 822, which may comprise the Cloud. The network interface hardware 818 is coupled to the communication path 802 such that the communication path 802 communicatively couples the network interface hardware 818 to other modules of the zero charge telephony protocol system 800. The network interface hardware 818 can be any device capable of transmitting and/or receiving data via a wireless network. Accordingly, the network interface hardware 818 can include a communication transceiver for sending and/or receiving data according to any wireless communication standard. For example, the network interface hardware 818 can include a chipset (e.g., antenna, processors, machine readable instructions, etc.) to communicate over wired and/or wireless computer networks such as, for example, wireless fidelity (Wi-Fi), WiMax, Bluetooth, IrDA, Wireless USB, Z-Wave, ZigBee, or the like.

Still referring to FIG. 8, data from various applications running on mobile client devices 820, 824, including data associated with the at least one SIM component 816 communicatively coupled to the mobile client devices 820, 824, can be provided to the zero charge telephony protocol system 800 via the network interface hardware 818. The mobile client devices 820, 824 can be any device having hardware (e.g., chipsets, processors, memory, etc.) for communicatively coupling with the network interface hardware 818 and a network 822. Specifically, the mobile client device 820, 824 can include an input device having an antenna for communicating over one or more of the wireless computer networks described above.

The network 822 can include any wired and/or wireless network such as, for example, wide area networks, metropolitan area networks, the Internet, an Intranet, the Cloud, satellite networks, or the like. Accordingly, the network 822 can be utilized as a wireless access point by the mobile client devices 820, 824 to access one or more servers (e.g., of the Cloud). Accessed servers, such as a cloud server, generally include processors, memory, and chipset for delivering resources via the network 822. Resources can include providing, for example, processing, storage, software, and information from the one or more servers to the zero charge telephony protocol system 800 via the network 822. Additionally, it is noted that the one or more servers can share resources with one another over the network 822 such as, for example, via the wired portion of the network 822, the wireless portion of the network 822, or combinations thereof.

In one embodiment, a zero charge telephony protocol system 800 and associated methods may include one or more processors 804, a non-transitory memory 806 communicatively coupled to the one or more processors 804, and machine readable instructions. The machine readable instructions are stored in the non-transitory memory 806 and cause the system 800 to automatically perform protocols when executed by the one or more processors 804, such as at least the following to: receive from a first user mobile device 820 (e.g., device 300, 330 and flow items 310, 340 as shown in FIGS. 3A-3B and flow items 110, 110 of FIGS. 1A-1B) associated with a first user account a call signal indicative of a request to place and complete a call to a mobile address of a second user mobile device 824 (e.g., device 308, 338 and flow items 311, 341 of FIGS. 3A-3B); and automatically modify the mobile address with a routing prefix to generate a modified call signal indicative of a modified address including the routing prefix when the first user account has insufficient balance to complete the call or is independent of balance (as shown in flow 101-102 of FIG. 1A, flow item 112 of FIG. 1B, and flow items 312, 342 of FIGS. 3A-3B).

The machine readable instructions may further cause the system 800 to perform at least the following when executed by the one or more processors: route to an asynchronous signaling switch based on a trunk communication path associated with the modified address (as shown in flow item 137 of FIG. 1C and flow items 313, 343 of FIGS. 3A-3B); revert the modified call signal at the asynchronous signaling switch to the call signal; deliver the call signal from the asynchronous signaling switch to the second user mobile device 824 (FIGS. 2, 3A, 3B, and 8) to complete the call; and automatically disconnect the call from the second user mobile device 824 immediately upon receipt of the call signal by the second user mobile device (flow items 280-290 of FIG. 2 and device 308, 338 and flow items 320-323, 350-353 of FIGS. 3A-3B). As described herein, immediately may reference an immediate or substantially immediate period of a short duration to prevent answering of the call after call completion (e.g., call ringing at an input destination) that occurs on the basis of placing (e.g., initiating and routing) the call and any associated verbal/speech communication over the call that may onset charges associated with the call.

The request may be received from the first user mobile device 300, 330, 820 (FIGS. 3A-3B and 8) at a MSC 301, 331 (flow items 310, 340 of FIGS. 3A-3B) to place and complete the call to the mobile address of the second user mobile device 308, 338, 824. Further, the mobile address may be automatically modified with a routing prefix including a star symbol (*) to generate the modified call signal indicative of the modified address including the star symbol as the routing prefix when the first user account has insufficient balance to complete the call.

The MSC 301, 331 may lookup a pre-configured routing table including a trunk indicator of the trunk (e.g., trunk communication path) associated with the modified address and translate/route the modified address based on the trunk indicator of the trunk associated with the modified address from the pre-configured routing table (e.g., flow item 136 of FIG. 1C and flow items 313, 343 of FIGS. 3A-3B). The modified call signal may be automatically routed along the trunk from the MSC to a Gateway MSC (GMSC) and then automatically routed along the trunk from the GMSC to the asynchronous signaling switch as the switch component 812 (e.g., flow items 137-140 of FIG. 1C and flow items 313, 343 of FIGS. 3A-3B).

In embodiments, the call may be disconnected from the first user mobile device by the asynchronous signaling switch (e.g., the switch component 812 of FIG. 8 and/or Star Switch 305, 335 and flow items 316, 346 of FIGS. 3A-3B) when the first user account has insufficient balance to complete the call in concurrence to routing the call signal to the second user mobile device. The call may be tracked between the first user mobile device 300, 330, 820, the asynchronous signaling switch 305, 335, 812, and the second user mobile device 824 with a plurality of call data recording (CDR) codes associated with the call within a period of time (flow items 318, 348 of FIGS. 3A-3B). A second user account of the second user mobile device 308, 338, 824 may be charged based on the plurality of CDR codes associated with the call upon a callback from the second user mobile device 308, 338, 824 to the first user mobile device 300, 330, 820 within the period of time.

The call signal may be delivered from the asynchronous signaling switch 305, 335, 812 to the second user mobile device 308, 338, 824 along with an identification delivery (e.g., CLI) configured to identify the first user mobile device 300, 330, 820, a ringing permission, and an answering restriction. As described herein, the ringing permission is configured to permit the second user mobile device to ring (or otherwise indicate an incoming call) upon receipt of the call signal and associated completion of the call, and the answering restriction is configured to restrict the second user mobile device from answering the call to provide access to speech communication, which may otherwise incur a charge. The call may be automatically disconnected from the second user mobile device 308, 338, 824 based on receipt by the second user mobile device of the identification delivery, the ringing permission, and the answering restriction (as shown in flow items 321-323, 351-353 of FIGS. 3A-3B).

In embodiments, the first user account may be associated with a balance-dependent subscriber identification module (SIM) card (e.g., a prepaid SIM card as a non-limiting example) and a balance-independent SIM card (e.g., a zero balance, zero airtime, and/or no-charge SIM card as non-limiting examples) as the at least one SIM component 816 (as shown in FIGS. 1A, 3A, 5, 6A-6B, and 8). As shown in FIG. 6B, the balance-dependent SIM card may be configured to include balance (e.g., digital monetary funds representative of payment) to place and complete the call and incur a charge through a balance-dependent service key invoking a balance-dependent logic when the first user account has sufficient balance to complete the call. As further shown in FIG. 6B, the balance-independent SIM card may be configured to place and complete the call without charge through a balance-independent service key invoking a no-charge logic separate and distinct from the balance-dependent logic when the first user account has insufficient balance to complete the call.

Alternatively, the first user account may be associated with a balance-independent SIM card as the at least one SIM component 816 (as shown in FIGS. 1B, 3B, 5, 6B, and 8). As shown in FIGS. 1B, 3B, and 6B, the first user account associated with the balance-independent SIM card may be configured to place and complete the call via the balance-independent SIM card independent of balance. In embodiments, the system may be configured to receive a payment in the first user account, and modify the balance-independent SIM card into a balance-dependent SIM card having a positive balance sufficient to place and complete a call.

In one other embodiment, a zero charge telephony protocol system 800 may include one or more processors 804, a non-transitory memory 806 communicatively coupled to the one or more processors 804, machine readable instructions stored in the non-transitory memory that cause the system 800 to perform at least the following when executed by the one or more processors 804: receive from a first user mobile device 820 (e.g., device 300, 330 and flow items 310, 340 as shown in FIGS. 3A-3B and flow items 110, 110 of FIGS. 1A-1B) associated with a first user account a call signal indicative of a request to place and complete a call to a mobile address of a second user mobile device 824 (e.g., device 308, 338 of FIGS. 3A-3B); automatically set a call duration time quota upon a synchronous charging onset when the first user account has insufficient balance to complete the call (e.g., flow item 663 of FIG. 6C); deliver the call signal to the second user mobile device 308, 338 (e.g., flow item 510 of FIG. 5) to complete the call; and automatically disconnect the call from the second user mobile device when the call is completed and when the call duration time quota is exceeded after the synchronous charging onset (flow item 663 of FIG. 6C). The call duration time quota may be 0 to 1 second from the synchronous charging onset.

In embodiments, and as shown in flow items 663 and 680 FIGS. 6C, the system 800 (FIG. 8) may be configured to continue to place the call when the first user account has sufficient balance to complete the call, and permit the call to proceed to speech post answering by the second user mobile device and based on the sufficient balance. The first user account may be associated with a balance-dependent subscriber identification module (SIM) card configured to include a balance to place and complete the call.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A system comprising:
   one or more processors;
   a non-transitory memory communicatively coupled to the one or more processors; and
   machine readable instructions stored in the non-transitory memory that cause the system to perform at least the following when executed by the one or more processors:
   receive, from a first communication device and by a switching node, a call request to complete a call to a second communication device;
   modify an address associated with the call request with a routing prefix to generate a modified address for inclusion in a modified call request based on detection of insufficient balance of an account associated with the first communication device to complete the call;
   transmit, by utilizing the switching node and in response to the call request, at least one first communication to the first communication device, wherein the at least one first communication comprises at least one service option, wherein the at least one first communication is transmitted based on detection of the insufficient balance of the account associated with the first communication device to complete the call;
receive a selection of a service option of the at least one option; and
provide at least one service in accordance with the service option corresponding to the selection.

2. The system of claim 1, wherein the selection of the service option is received from the first communication device.

3. The system of claim 1, wherein the system is further caused to perform at least the following:
query a balance of the account to detect whether the insufficient balance exists.

4. The system of claim 1, wherein the system is further caused to perform at least the following:
terminate, in response to receiving the selection, a telephony connection with the first communication device.

5. The system of claim 1, wherein the system is further caused to perform at least the following:
send a second communication to the second communication device after receiving the selection of the service option.

6. The system of claim 1, wherein the system further causes to perform at least the following:
cause a network to play a service announcement to the first communication device upon detection of the insufficient balance of the account to complete the call.

7. The system of claim 1, wherein the system further causes to perform at least the following:
issue a command to complete the call to the second communication device if sufficient balance to complete the call is detected.

8. The system of claim 1, wherein the at least one service option comprises an option to replenish credit, an option to request airtime credit, an option to permit the first communication device to request a collect call, or a combination thereof.

9. The system of claim 1, wherein the system further causes to perform at least the following:
interlace an interactive voice response menu into the call when transmitting the at least one first communication.

10. The system of claim 1, wherein the system further causes to perform at least the following:
providing the at least one service option in an options menu with the at least one first communication.

11. The system of claim 1, wherein the system further causes to perform at least the following:
terminating, in response to receiving the selection, a telephony connection with the first communication device.

12. The system of claim 1, wherein the system further causes to perform at least the following:
conduct a lookup of a routing table to determine a communication path associated with the modified address.

13. The system of claim 12, wherein the system further causes to perform at least the following:
route the modified call request using the communication path determined from the routing table.

14. A computer-implemented method, comprising:
receiving, from a first communication device and by a switching node, a call request to complete a call to a second communication device;
modifying an address associated with the call request with a routing prefix to generate a modified address for inclusion in a modified call request based on detection of insufficient balance of an account associated with the first communication device to complete the call;
transmitting, by utilizing the switching node and in response to the call request, at least one first communication to the first communication device, wherein the at least one first communication comprises at least one service option, wherein the at least one first communication is transmitted based on detection of the insufficient balance of the account associated with the first communication device to complete the call;
receiving a selection of a service option of the at least one option; and
providing at least one service in accordance with the service option corresponding to the selection.

15. He method of claim 14, further comprising causing a network to play a service announcement to the first communication device upon detection of the insufficient balance of the account to complete the call.

16. The method of claim 14, further comprising transmitting a second communication to the second communication device after receiving the selection of the service option.

17. The method of claim 14, further comprising issuing a command to complete the call to the second communication device if sufficient balance to complete the call is detected.

18. The method of claim 14, further comprising terminating, in response to receiving the selection, a telephony connection with the first communication device.

19. The method of claim 14, further comprising conduct a lookup of a routing table to determine a communication path associated with the modified address.

20. An apparatus, comprising:
one or more processors; and
one or more memories operatively connected to at least one of the one or more processors and having instructions stored thereon that, when executed by at least one of the one or more processors, cause at least one of the one or more processors to:
receive, from a first communication device and by a switching node, a call request to complete a call to a second communication device;
modifying an address associated with the call request with a routing prefix to generate a modified address for inclusion in a modified call request based on detection of insufficient balance of an account associated with the first communication device to complete the call;
transmit, by utilizing the switching node and in response to the call request, at least one first communication to the first communication device, wherein the at least one first communication comprises at least one service option, wherein the at least one first communication is transmitted based on detection of the insufficient balance of the account associated with the first communication device to complete the call; and
provide at least one service in accordance with a selection of a service option of the at least one service option.

* * * * *